US011514683B2

(12) United States Patent
Ogata et al.

(10) Patent No.: US 11,514,683 B2
(45) Date of Patent: Nov. 29, 2022

(54) OUTSIDE RECOGNITION APPARATUS FOR VEHICLE

(71) Applicant: Faurecia Clarion Electronics Co., Ltd., Saitama (JP)

(72) Inventors: Takehito Ogata, Tokyo (JP); Toshihisa Kuwahara, Saitama (JP); Masahiro Kiyohara, Saitama (JP); Yoshitaka Uchida, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 259 days.

(21) Appl. No.: 16/651,610

(22) PCT Filed: Sep. 28, 2018

(86) PCT No.: PCT/JP2018/036265
§ 371 (c)(1),
(2) Date: Mar. 27, 2020

(87) PCT Pub. No.: WO2019/065970
PCT Pub. Date: Apr. 4, 2019

(65) Prior Publication Data
US 2020/0302192 A1 Sep. 24, 2020

(30) Foreign Application Priority Data
Sep. 29, 2017 (JP) .............................. JP2017-192230

(51) Int. Cl.
*G06V 20/58* (2022.01)
*B60R 11/04* (2006.01)
*G08G 1/16* (2006.01)
*G06V 20/64* (2022.01)

(52) U.S. Cl.
CPC .............. *G06V 20/58* (2022.01); *B60R 11/04* (2013.01); *G06V 20/64* (2022.01); *G08G 1/16* (2013.01); *B60R 2300/105* (2013.01); *B60R 2300/8093* (2013.01)

(58) Field of Classification Search
CPC .......... G08G 1/16; G08G 1/166; G08G 1/167; G06K 9/00; G06K 9/00798; G06K 9/00805; G06V 20/58; G06V 20/64
See application file for complete search history.

(56) References Cited

U.S. PATENT DOCUMENTS

2008/0088707 A1* 4/2008 Iwaki .................... G01S 13/931
348/208.1
2011/0019873 A1* 1/2011 Yamato .................. G08G 1/165
382/103

(Continued)

FOREIGN PATENT DOCUMENTS

| EP | 2 482 030 A1 | 8/2012 |
| JP | 2011-150633 | 8/2011 |
| JP | 2014-006588 | 1/2014 |
| JP | 2014-240753 | 12/2014 |

OTHER PUBLICATIONS

NPL Search (Apr. 15, 2022).*

(Continued)

*Primary Examiner* — Van T Trieu
(74) *Attorney, Agent, or Firm* — Reising Ethington, P.C.

(57) ABSTRACT

An on-board outside recognition apparatus extracts a feature point from an image including an environment around a user's own vehicle, measures a three-dimensional position of the feature point based on movement of the feature point tracked in time series on the image and calculates a foot position of the feature point on the image from the three-dimensional position of the feature point is performed. Then, the on-board outside recognition apparatus extracts a road surface area where the user's own vehicle can travel, from the image using a degree of similarity of a texture of the image, and judges a feature point the foot position of which is judged not to be included in the road surface area to be highly reliable.

6 Claims, 20 Drawing Sheets

(56) References Cited

U.S. PATENT DOCUMENTS

2013/0057688 A1* 3/2013 Furukawa ............. G08G 1/166
                                                    348/148
2014/0362193 A1  12/2014 Kanetake et al.
2019/0156129 A1*  5/2019 Kakegawa ................ G06T 1/00

OTHER PUBLICATIONS

Extended European Search Report dated Apr. 19, 2021 regarding European Patent Application No. 18861091.9 (12 pages).
Alexander et al., "Camera based detection and classification of soft shoulders, curbs and guardrails," IEEE Intelligent Vehichles Symposium ((IV), Jun. 23-26, 2013, Gold Coast, Australia, pp. 853-858.
Rodriguez et al., "An embedded multi-modal system for object localization and tracking," IEEE Inteligent Transportation Systems Magazine, Winter 2012, pp. 42-53.
Scharfenberger, "Panoramic Vision for Automotive Applications: From Image Rectification to Ambiance Monitoring and Driver Body Height Estimation," The dissertation was published on Nov. 18, 2010 at the Technical University of Munich submitted and submitted by the Faculty of Electrical Engineering and Information Technology on Feb. 3, 2011 accepted, pp. 1-206).
International Search Report with Written Opinion, corresponding to PCT/JP2018/036265, dated Nov. 20, 2018, 9 pages.
Japanese Office Action dated Oct. 20, 2020 regarding Japanese Patent Application No. 2017-192230 corresponding to U.S. Appl. No. 16/651,610 (4 pages) with English Translation (4 pages).

\* cited by examiner

FIG. 6
(a)
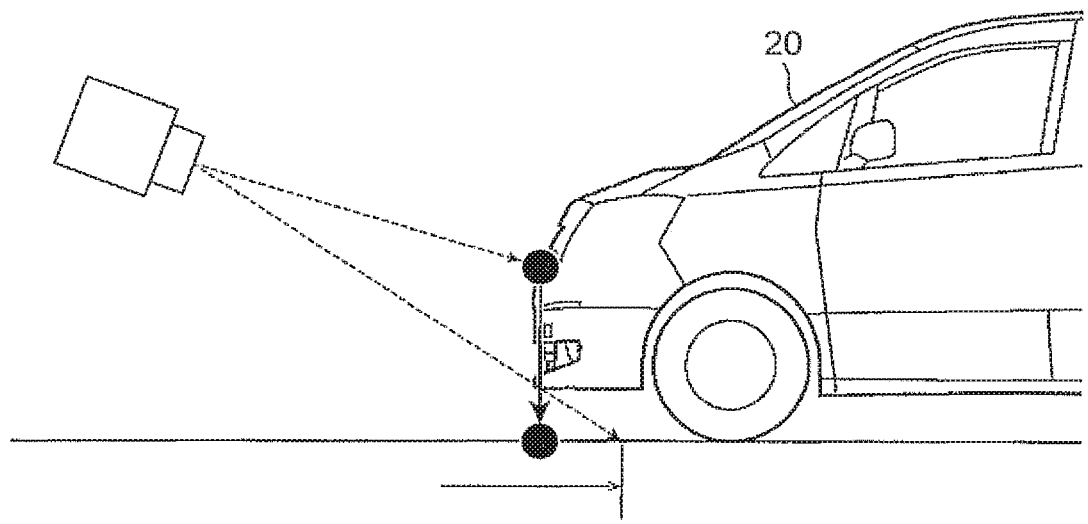
(b)
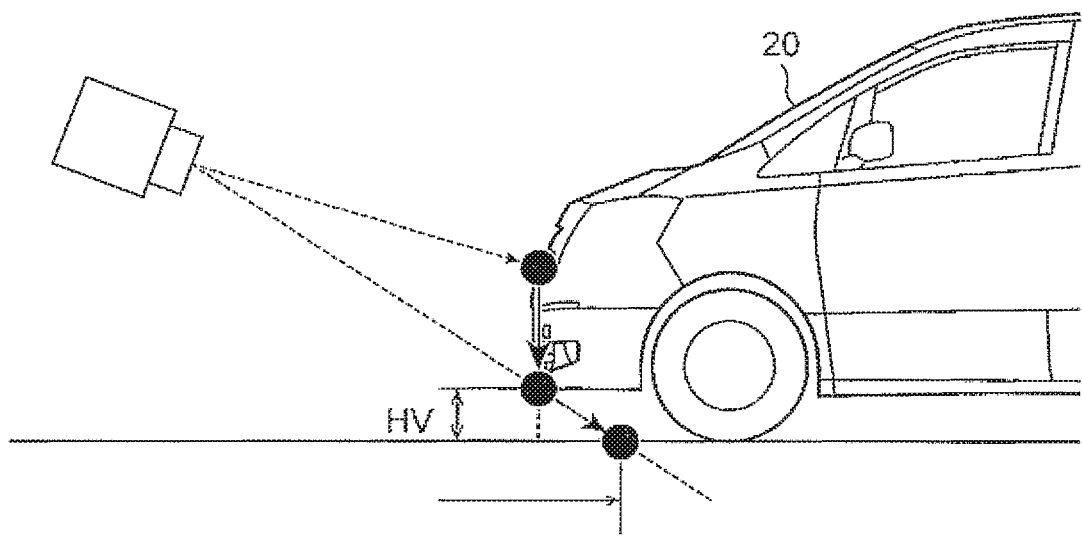

FIG.9
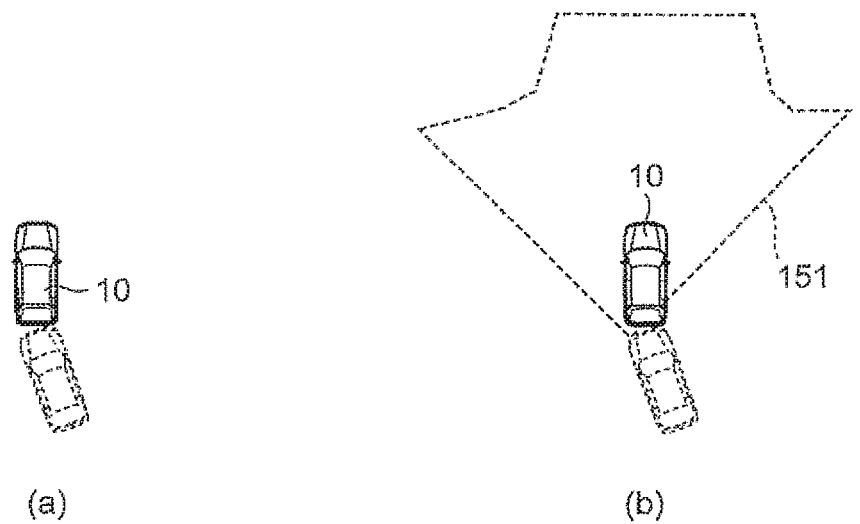
(a)    (b)
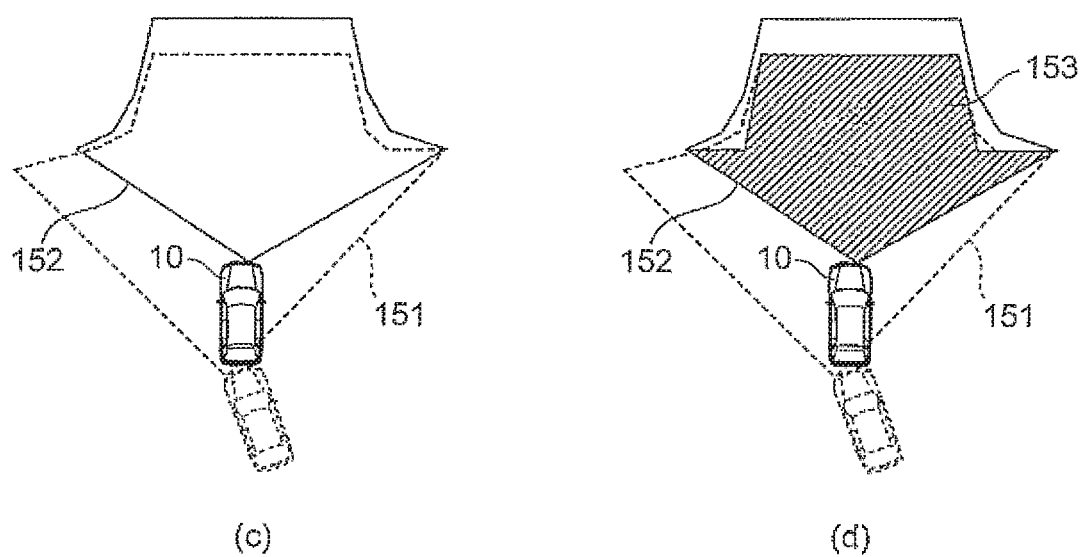
(c)    (d)

FIG.18
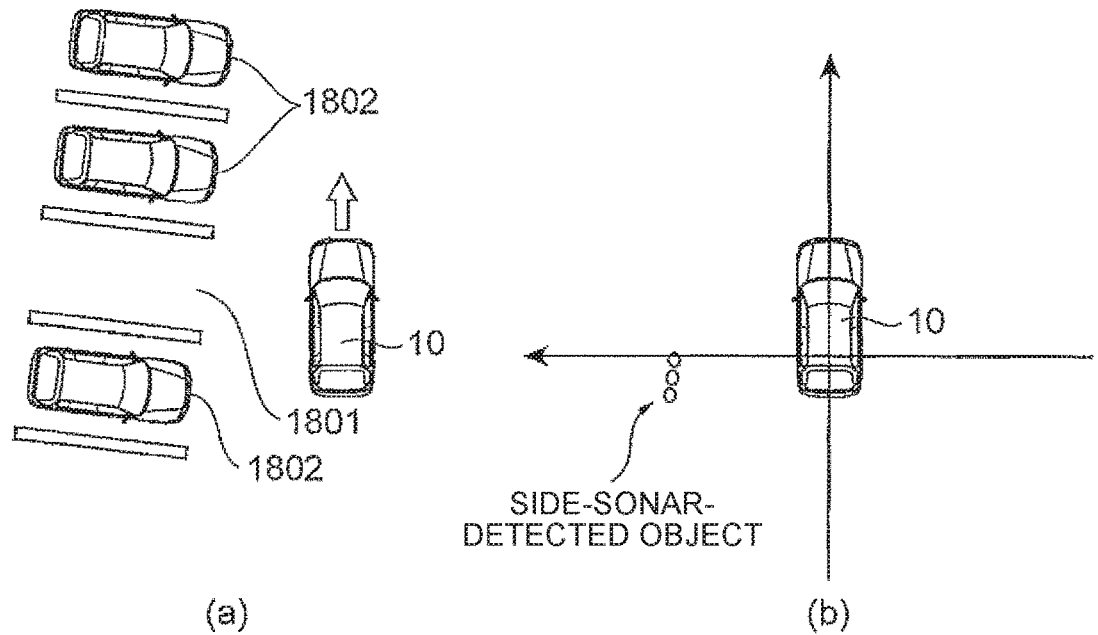
(a)
(b)
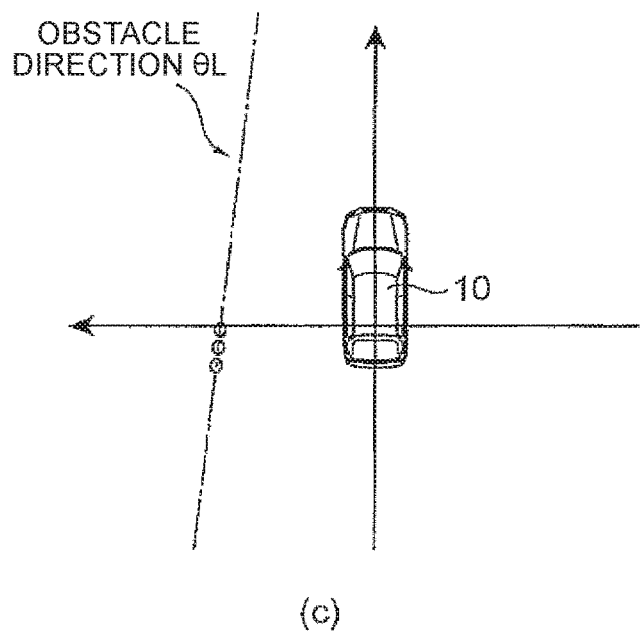
(c)

OUTSIDE RECOGNITION APPARATUS FOR VEHICLE

CROSS-REFERENCE TO RELATED APPLICATION(S)

This application is a U.S. National Phase Patent Application and claims priority to and the benefit of International Application Number PCT/JP2018/036265, filed on Sep. 28, 2018, which claims priority of Japanese Patent Application Number 2017-192230, filed on Sep. 29, 2017, the entire contents of all of which are incorporated herein by reference.

TECHNICAL FIELD

The present invention relates to an outside recognition apparatus for vehicle that recognizes a travelable space around a user's own vehicle based on information from an image sensor such as a camera.

BACKGROUND ART

Recently, development of a system to recognize an outside around a user's own vehicle using a camera to support a driver's driving operation has been promoted. For example, an autonomous parking system and the like to detect a parking space around a user's own vehicle and automatically perform a part or all of a driver's parking operation have been put to practical use.

If it is possible to recognize a travelable area around a user's own vehicle after detecting a parking space, it becomes possible to generate an optimal parking route according to the travelable area, and it is possible to perform parking in a shortest time. On the other hand, if positions of obstacles around the user's own vehicle cannot be correctly detected, a parking route is generated in a travelable area which is smaller than the actual area. Phenomena, such as that the number of turning back operations increases and that a judgment that parking is impossible is made, may occur, and usability for users decreases. In order to solve this problem, there is a method for confirming whether a measured obstacle is correct or not.

For example, Patent Literature 1 describes means for detecting a feature point from an image and measuring three-dimensional information from time-series movement of the feature point, and a method for calculating a foot position on the image from the measured feature point, and using presence/absence of an edge of the foot position to judge, if the edge exists, that a measurement result of the feature point is not probable.

CITATION LIST

Patent Literature

Patent Literature 1: Japanese Patent Laid-Open No. 2014-240753

SUMMARY OF INVENTION

Technical Problem

There is no problem in the case of such an obstacle that an edge of a foot position is clear. However, for example, in the case of a vehicle, an edge of a bumper appears at a position higher than a road surface, and the edge is observed at a position different from a foot when being observed by a camera for parking assistance. Further, in the case of such an obstacle that a foot edge does not easily appear, like a pedestrian, the judgment is difficult. On the contrary, if an edge accidentally exists on a road surface, a misjudgment is made.

The present invention has been made in view of the above point, and an object is to provide an outside recognition apparatus for vehicle capable of judging a probability of measurement of a feature point even in the case of such an obstacle that it is difficult to observe a foot edge using a camera image.

Solution to Problem

An on-board outside recognition apparatus of the present invention to solve the above problem is an on-board outside recognition apparatus recognizing a travelable space around a user's own vehicle, the on-board outside recognition apparatus including: an image acquiring portion acquiring an image including an environment around the user's own vehicle; a feature point position measuring portion extracting a feature point from the image and measuring a three-dimensional position of the feature point based on movement of the feature point tracked in time series on the image; a road surface area estimating portion estimating a road surface area where the user's own vehicle can travel from the image using a degree of similarity of a texture of the image; a feature point foot position calculating portion calculating a foot position from the three-dimensional position of the feature point; and an obstacle judging portion comparing the foot position of the feature point and the road surface area and judging a feature point the foot position of which is not included in the road surface area to be a feature point of a stationary obstacle around the user's own vehicle.

Advantageous Effect of Invention

According to the present invention, a probability of a feature point is judged using overlap between a measured foot position of the feature point and a road surface area. Therefore, even if the foot position of the feature point and a position of an edge are different, or it is difficult to observe a foot edge, it does not influence. Further, misjudgment due to an edge that accidentally exists does not occur. Therefore, it is possible to accurately grasp a position of a stationary obstacle around a user's own vehicle.

Further, features related to the present invention will be apparent from description of the present specification and accompanying drawings. Subjects, components and effects other than those described above will be apparent from description of embodiments below.

BRIEF DESCRIPTION OF DRAWINGS

FIG. 6 is an explanatory diagram of the process of the foot position calculating portion.

FIG. 9 is an explanatory diagram of the time-series process.

FIG. 18 is a diagram illustrating an example of obstacle judgment by the obstacle judging portion.

DESCRIPTION OF EMBODIMENTS

First Embodiment

Figure 1:
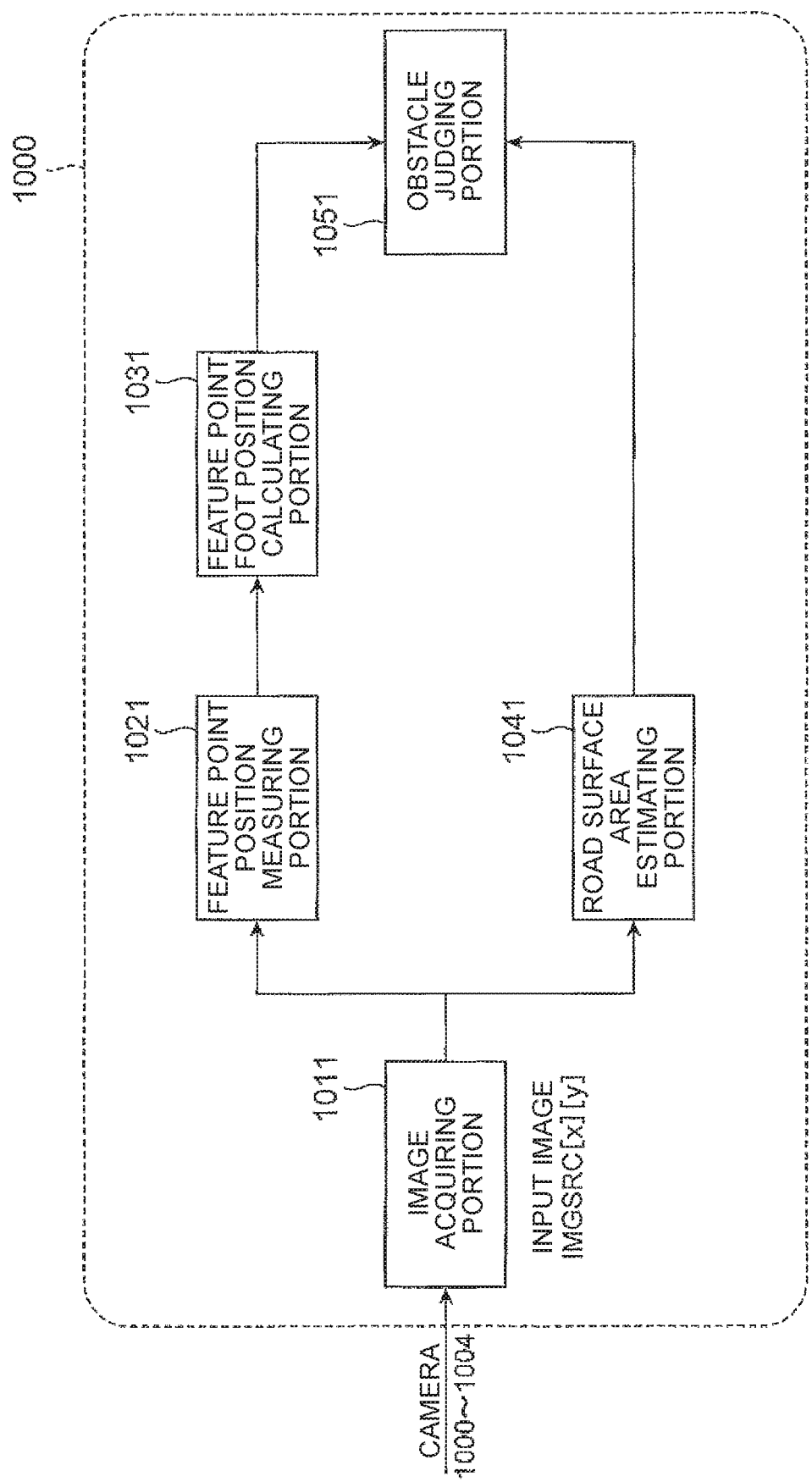
FIG. 1 is a block diagram of an on-board outside recognition apparatus in a first embodiment.

A first embodiment of the present invention will be described below in detail using drawings. FIG. 1 is a block diagram of an on-board outside recognition apparatus 1000 in the first embodiment.

The on-board outside recognition apparatus 1000 is incorporated in a camera apparatus mounted on a car, an integrated controller or the like and is for recognizing an outside from images photographed by cameras 1001 to 1004 of the camera apparatus. In the present embodiment, the on-board outside recognition apparatus 1000 is configured to recognize obstacles around a user's own vehicle.

The on-board outside recognition apparatus 1000 is configured with a computer having a CPU, a memory, I/O and the like. A predetermined process is programmed, and the process is repeatedly executed at a predetermined cycle T.

As shown in FIG. 1, the on-board outside recognition apparatus 1000 has an image acquiring portion 1011, a feature point position measuring portion 1021, a feature point foot position calculating portion 1031, a road surface area estimating portion 1041 and an obstacle judging portion 1051.

Figure 2:
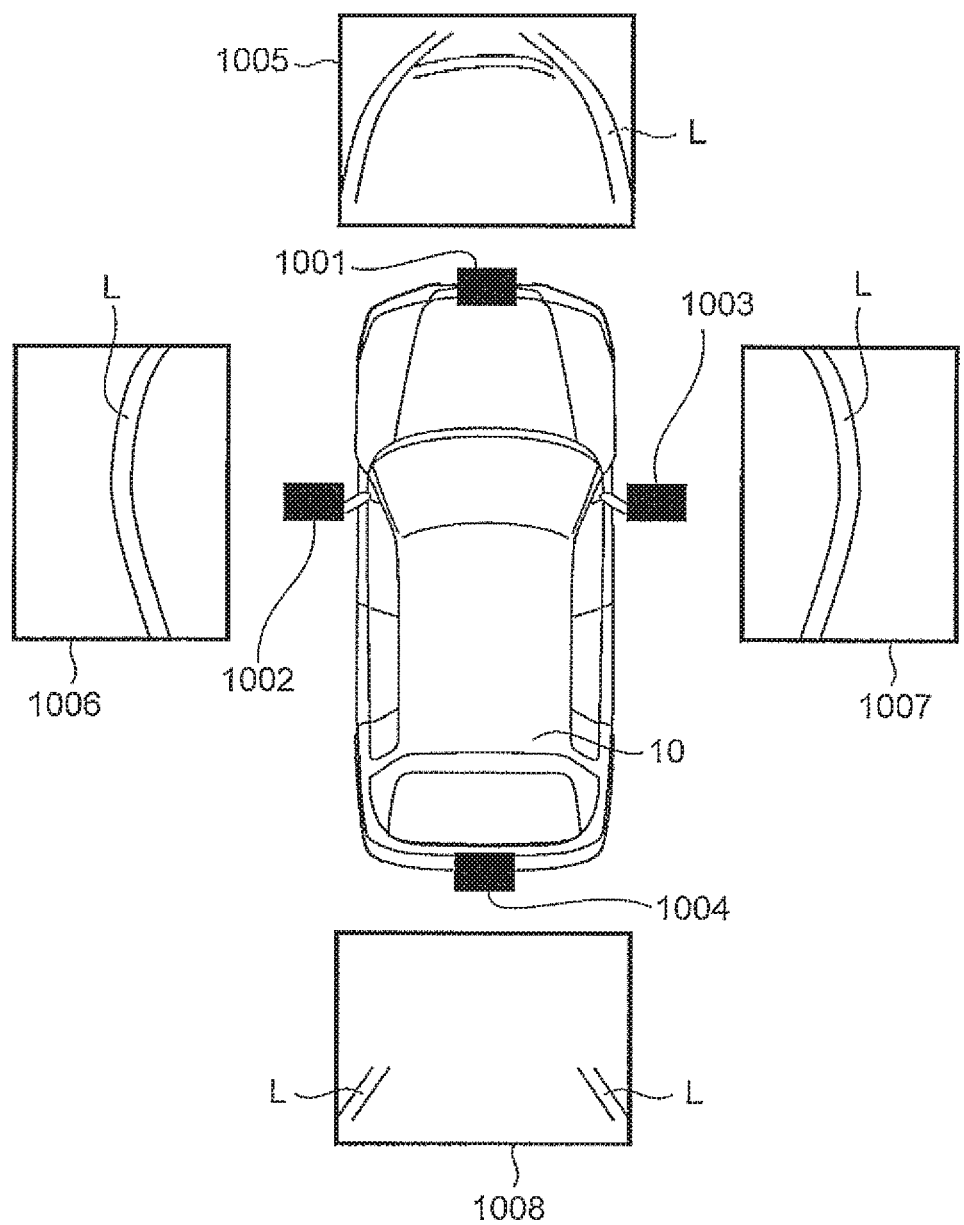
FIG. 2 is a diagram illustrating a configuration of an image acquiring portion.

The image acquiring portion 1011 acquires an image including an environment around the user's own vehicle. As shown in FIG. 2, the image acquiring portion 1011 acquires, from the cameras 1001 to 1004 attached at positions where it is possible to capture an image of surroundings around the user's own vehicle 10, at least one or more of images 1005 to 1008 obtained by photographing the surroundings around the user's own vehicle. In the present embodiment, based on information about a travel direction of the user's own vehicle 10, the image 1005 captured up by the front camera 1001 is acquired during forward travel, and the image 1008 captured by the rear camera 1004 is acquired during backward travel. The acquired image is recorded onto a RAM as a two-dimensional array. Hereinafter, an input image is indicated by IMGSRC[x] [y]. Each of x and y indicates a coordinate of the image. Each of the images 1005 to 1008 shown in FIG. 2 is an image when the user's own vehicle 10 is parked in a parking frame facing forward, and parking space lot lines L are image-captured.

The feature point position measuring portion 1021 extracts feature points from an image and measures three-dimensional positions of the feature points based on movements of the feature points tracked in time series on the image. In other words, the feature point position measuring portion 1021 extracts feature points FP[p] from the input image IMGSRC[x] [y], and measures distances from the user's own vehicle 10 to the feature points FP[p] as three-dimensional positions of the feature points, based on movements of the feature points FP[p] tracked in time series on the image (time-series changes of the feature points). By detecting the feature points FP[p] from the input image IMGSRC[x] [y] and tracking the feature points FP[p] in time series, the feature point position measuring portion 1021 measures a three-dimensional distance table FPW[p] from an image coordinate table FPI[p] for each feature point. Here, FPI[p] is image coordinates (x, y); FPW[p] is a one-dimensional array of a table having elements of world coordinates (x, y, z) with a rear wheel axle of the user's own vehicle as an origin; and p indicates an ID when a plurality are detected. Details of the process will be described later.

The feature point foot position calculating portion 1031 calculates foot positions of the feature points from the three-dimensional positions of the feature points. In other words, the feature point foot position calculating portion 1031 calculates foot positions FPW0[p] of the feature points FP[p] from the world coordinates FPW[p] of the feature points FP[p] using camera geometry information such as an installation height and angle of the camera. Here, FPW0[p] is a one-dimensional array of a table having elements of world coordinates (x, y, 0), and p indicates ID's when a plurality are detected. Details of the process will be described later. A foot position of a feature point refers to a position on a road surface vertically below a position of the feature point.

The road surface area estimating portion 1041 estimates a road surface area where the user's own vehicle can travel from the image, using a degree of similarity of a texture of the image. In other words, from the input image IMGSRC[x] [y], the road surface area estimating portion 1041 analyzes texture information about the image to extract a road surface area. There are various ways of holding information. In the present embodiment, a grid map GRD[x] [y] with approximately 5-cm grids, with a center of the rear wheel axle of the user's own vehicle as an origin is prepared to cover a range of about 10 m in forward, backward, left and right directions and such an estimated value that is closer to "1" for a more road-surface-like area and closer to "0" for a more non-road-surface-like area is held in each grid. Details of the process will be described later.

The obstacle judging portion 1051 compares the foot positions of the feature points and the estimated road surface area to judge a feature point the foot position of which is not included in the estimated road surface area to be a feature point of a stationary obstacle around the user's own vehicle. In other words, the obstacle judging portion 1051 compares coordinates of the foot positions FPW0[p]=(x, y, 0) of the feature points FP[p] and the grid GRD[x] [y] in which road-area estimated values are stored to generate obstacle feature points OFP[q], which are a result of removing feature points the foot positions of which are included in the road surface area and leaving feature points the foot positions of which are not included in the road surface area. Details of the process will be described later.

[Feature Point Position Measuring Portion 1021]

Next, content of the process of the feature point position measuring portion 1021 will be described using FIGS. 3 and 4.

Figure 3:
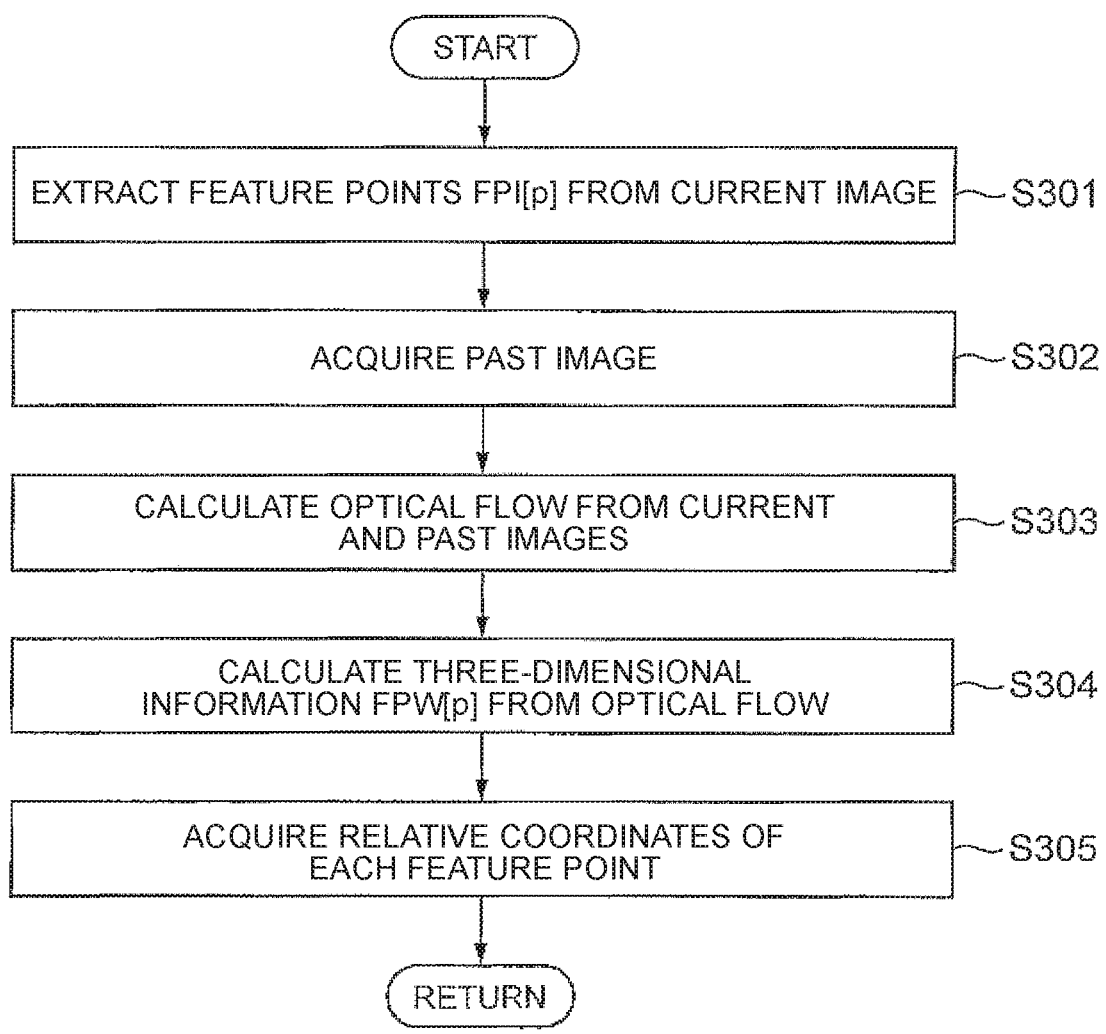
FIG. 3 is a flowchart showing a flow of a process of a feature point position measuring portion.
Figure 4:
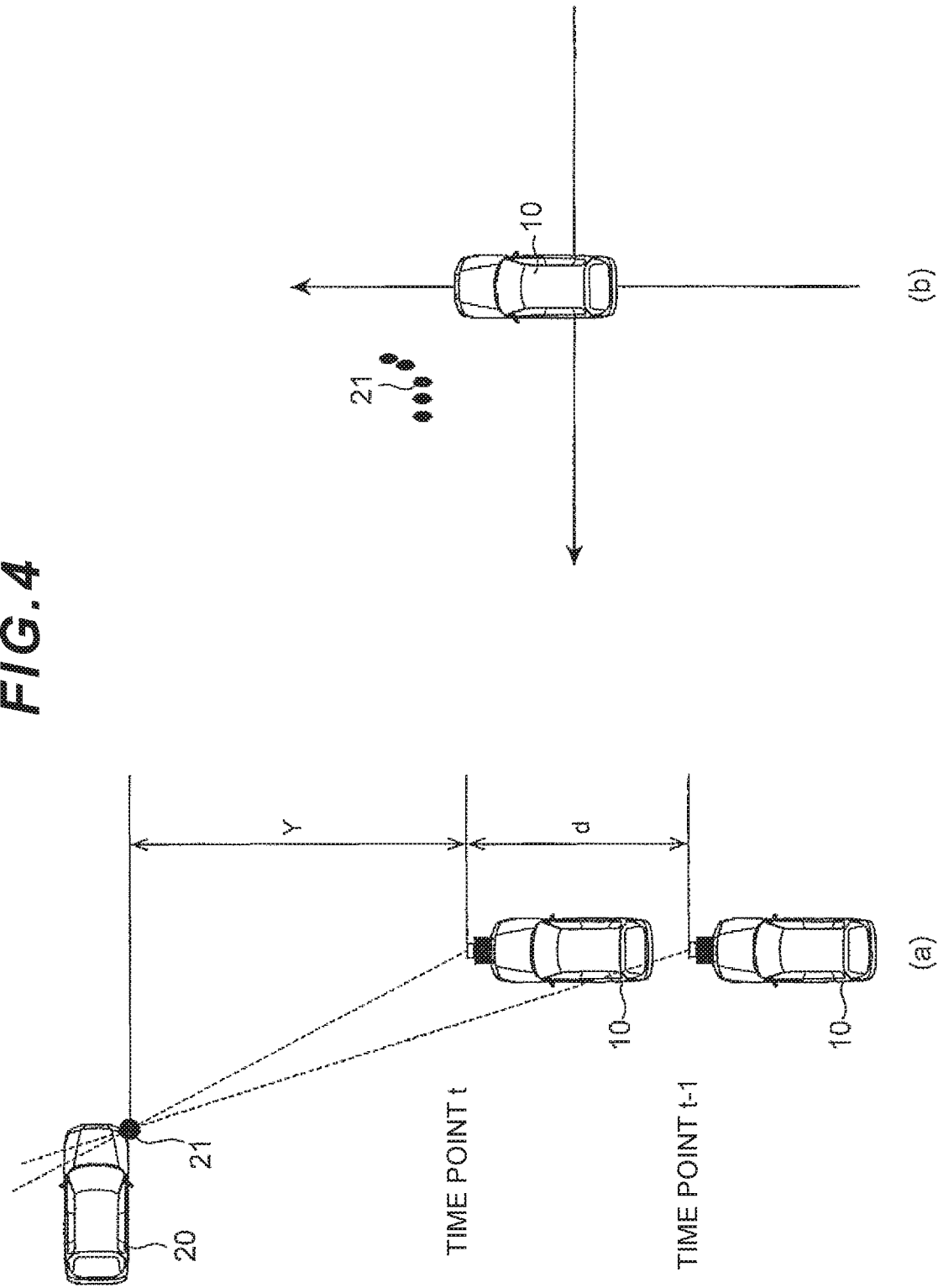
FIG. 4 is an explanatory diagram of the process of the feature point position measuring portion.

FIG. 3 is a flowchart showing a flow of the process of the feature point position measuring portion 1021. FIG. 4 is an explanatory diagram of the process of the feature point position measuring portion 1021.

The feature point position measuring portion 1021 performs the process for the input image IMGSRC[x][y].

First, at step S301, feature points FPI[p] are extracted from an input image IMGSRC[x][y] which is a current image. For the extraction of the feature points FPI[p], a publicly known method such as Harris Corner Detection is used. As a result, image coordinates are obtained for each feature point.

Next, at step S302, a past image IMGSRC P before a predetermined time point, which has been acquired by the same camera, is acquired.

Next, at step S303, an optical flow is calculated from the current and past images. Here, a position on the past image IMGSRC P corresponding to each feature point FPI[p] on the current image IMGSRC is calculated by an optical flow method to obtain movement vectors FP_VX[p] and FP_VY[p] of each feature point. For the optical flow, a publicly known method such as a Lucas-Kanade method is used.

Then, at step S304, three-dimensional information FPW [p] is calculated from the optical flow. Here, a three-dimensional position of each feature point FPI[p] around the user's own vehicle is calculated using the feature point FPI[p] and the movement vectors FP_VX[p] and FP_VY[p]. As a method for the calculation, publicly known means is used. In the present embodiment, the movement vectors on the image, and an amount of movement of the user's own vehicle calculated using user's own vehicle positions DRC[t] and DRC[t−1] acquired by CAN are used. Here, t is a symbol indicating a timing of the process, and the amount of movement of the user's own vehicle DRC[t] indicates X, Y and a yaw angle in a coordinate system with the center of the rear wheel axle of the user's own vehicle as an origin. The amounts of movement for X, Y and the yaw angle are obtained by the user's own vehicle positions DRC[t] and DRC[t−1].

Lastly, at step S305, a process for acquiring relative coordinates of each feature point is performed. Here, the three-dimensional positions of each feature point are converted to the coordinate system with the center of the rear wheel axle of the user's own vehicle as the origin and stores the coordinate system as a distance table FPW[p].

As shown in FIG. 4(a), by the past user's own vehicle position DRC[t−1] and the current user's own vehicle position DRC[t] changing, a parallax is generated, and a distance can be measured. In the example shown in FIG. 4(a), based on the parallax generated by the user's own vehicle 10 traveling by a distance d during a period from a time point t−1 to a time point t, a distance Y to a parked vehicle 20 is measured. Since a distance is measured for each of feature points of an image, for example, a result of measurement for the parked vehicle 20 is measurement of a plurality of points 21 as shown in FIG. 4(b).

[Feature Point Foot Position Calculating Portion 1031]

Next, content of the process of the feature point foot position calculating portion 1031 will be described.

In the present embodiment, two methods will be described.

First, the first method is a method in which the distance table FPW[p] is simply copied to a distance table FPW0[p]= (x, y, z), and z=0 is set in the distance table FPW0[p].

The second method is a method in which, at the time of calculating foot positions from three-dimensional positions of feature points, a surface road height is set to a position higher than the actual road surface to calculate image coordinates, and three-dimensional coordinates at the road surface height position at the image coordinates are calculated. This second method will be described using FIG. 5.

Figure 5:
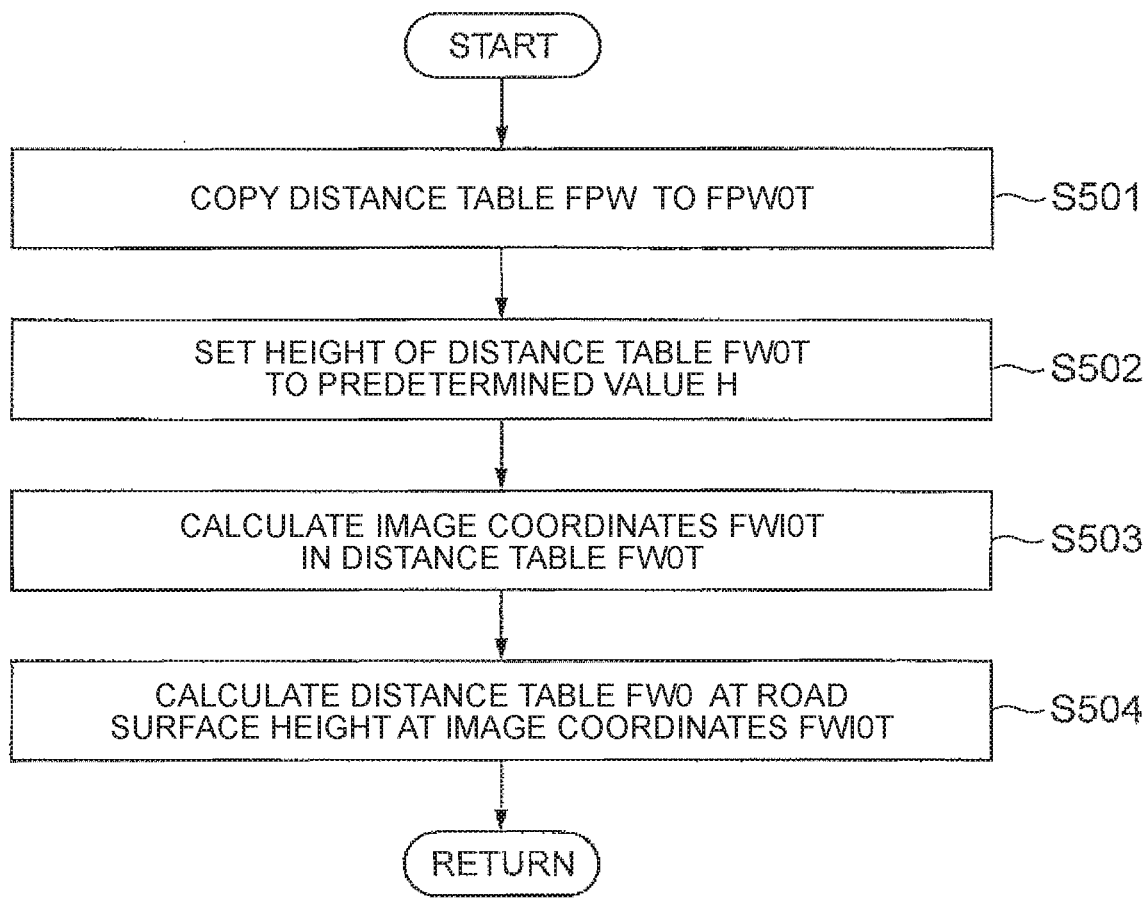
FIG. 5 is a flowchart showing a flow of a process of a foot position calculating portion.

FIG. 5 is a flowchart showing a flow of the process of the feature point foot position calculating portion 1031.

First, at step S501, a distance table FPW[p]=(x, y, z) is copied to a distance table FPW0T[p]=(x, y, z).

Next, at step S502, a height z in the distance table FPW0T[p] is set to a value "Hv" higher than the actual road surface.

Next, at step S503, an image coordinate table FPI0[p] is calculated from the distance table FPW0T[p].

For the calculation, camera geometry information registered in advance, such as a camera installation height, an installation angle and a lens distortion table, is used. Since the process for calculating image coordinates from world coordinates using camera geometry information is a publicly known technique, detailed description will be omitted.

Then, at step S504, a distance table FPW0[p]=(x, y, 0) at the road surface height (z=0) at positions of the image coordinate table FPI0[p] is calculated.

Which of the first and second methods described above is to be used as the method for calculating a foot position can be selected according to the camera installation height of the user's own vehicle 10. Further, a value of the height Hv of the second method may be changed according to a destination place or a model of the user's own vehicle. Furthermore, a type of a vehicle in the image may be discriminated with a discriminator by machine learning to change the value of the height Hv according to the type. Since a method for detecting a vehicle and judging a vehicle model by machine learning is a publicly known technique, description will be omitted here. FIG. 6 is a diagram schematically showing a state of capturing an image of another vehicle by a camera of the user's own vehicle. FIG. 6(a) shows the first method, and FIG. 6(b) shows the second method.

As shown in FIG. 6(a), when the processes by the feature point position measuring portion 1021 and the road surface area estimating portion 1041 are executed for another vehicle 20 as a target, using a camera installed low, a road surface area estimated by the road surface area estimating portion 1041 extends under the bumper because a bumper of the user's own vehicle is at a position higher than a road surface, and a road surface area is detected as a larger range than a distance obtained by the feature point position measuring portion 1021. Therefore, as shown in FIG. 6(b), by performing conversion to image coordinates once at the position of the height Hv of the bumper of the user's own vehicle and determining a distance at the road surface height at the image coordinates (z=0), it is possible to prevent the distance table FPW0[p] and the road surface area from overlapping with each other.

In other words, in the first method, since a foot position calculated by the feature point foot position calculating portion 1031 enters the road surface area estimated by the road surface area estimating portion 104 as shown in FIG. 6(a), there is a possibility that the feature point is judged to be a feature point that has been misdetected and removed by the obstacle judging portion 1051. In comparison, in the second method, it is considered that a lower edge of the bumper exists below the feature point by a predetermined length as shown in FIG. 6(*b*), and this position, in other words, a position at the height Hv from the road surface, above the foot position is used for obstacle judgment by the obstacle judging portion 1051. The obstacle judging portion 1051 performs a process for, if a position on the road surface obtained when a line connecting the camera and the position at the height HV from the road surface, above the foot position is extended up to the road surface is located near an edge of the estimated road surface area, leaving the feature point as a feature point of an obstacle.

[Road Surface Area Estimating Portion 1041]

Next, content of the process of the road surface area estimating portion 1041 will be described using FIGS. 7, 8 and 9.

Figure 7:
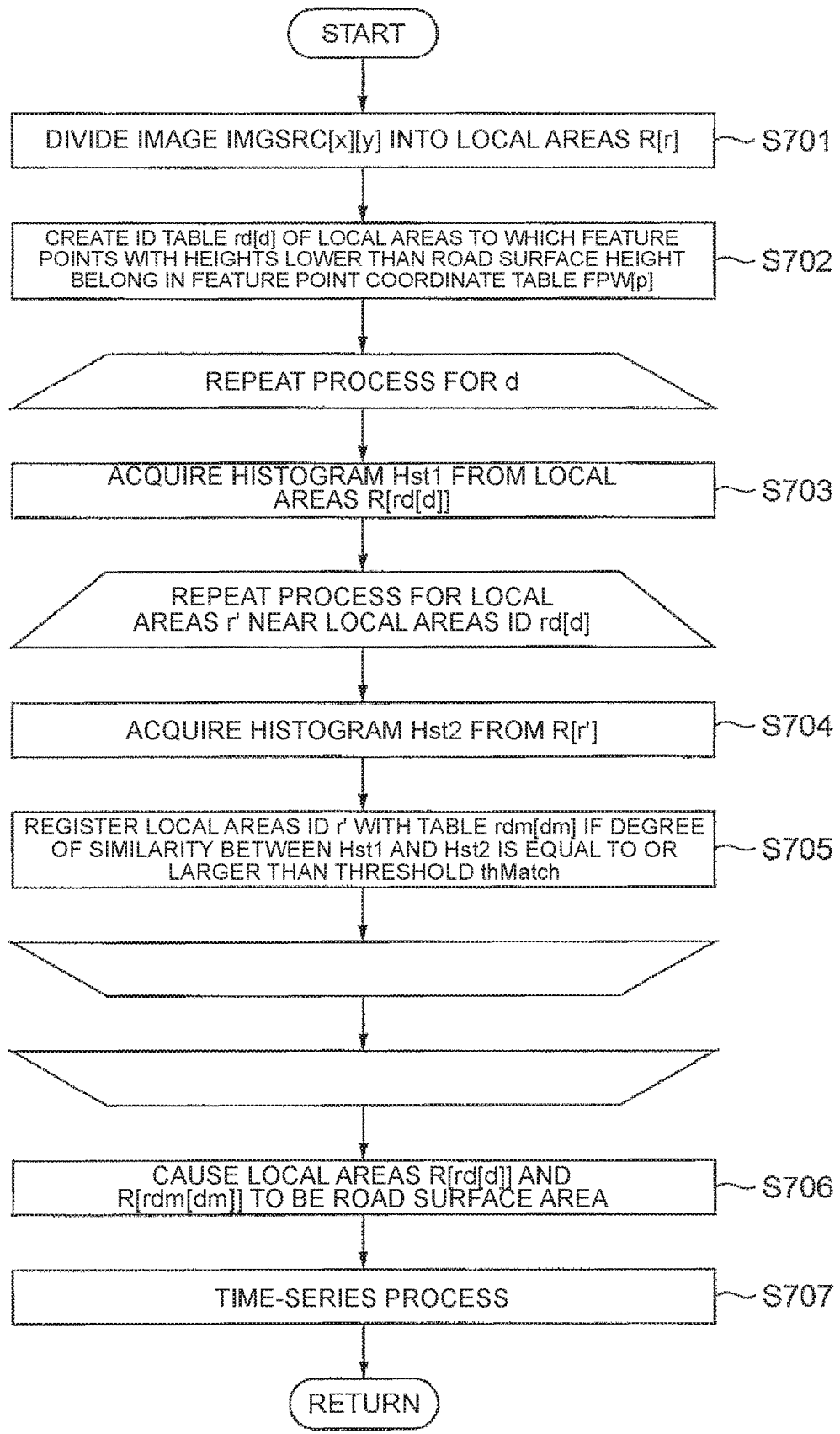
FIG. 7 is a flowchart showing a flow of a process of a road surface area estimating portion.
Figure 8:
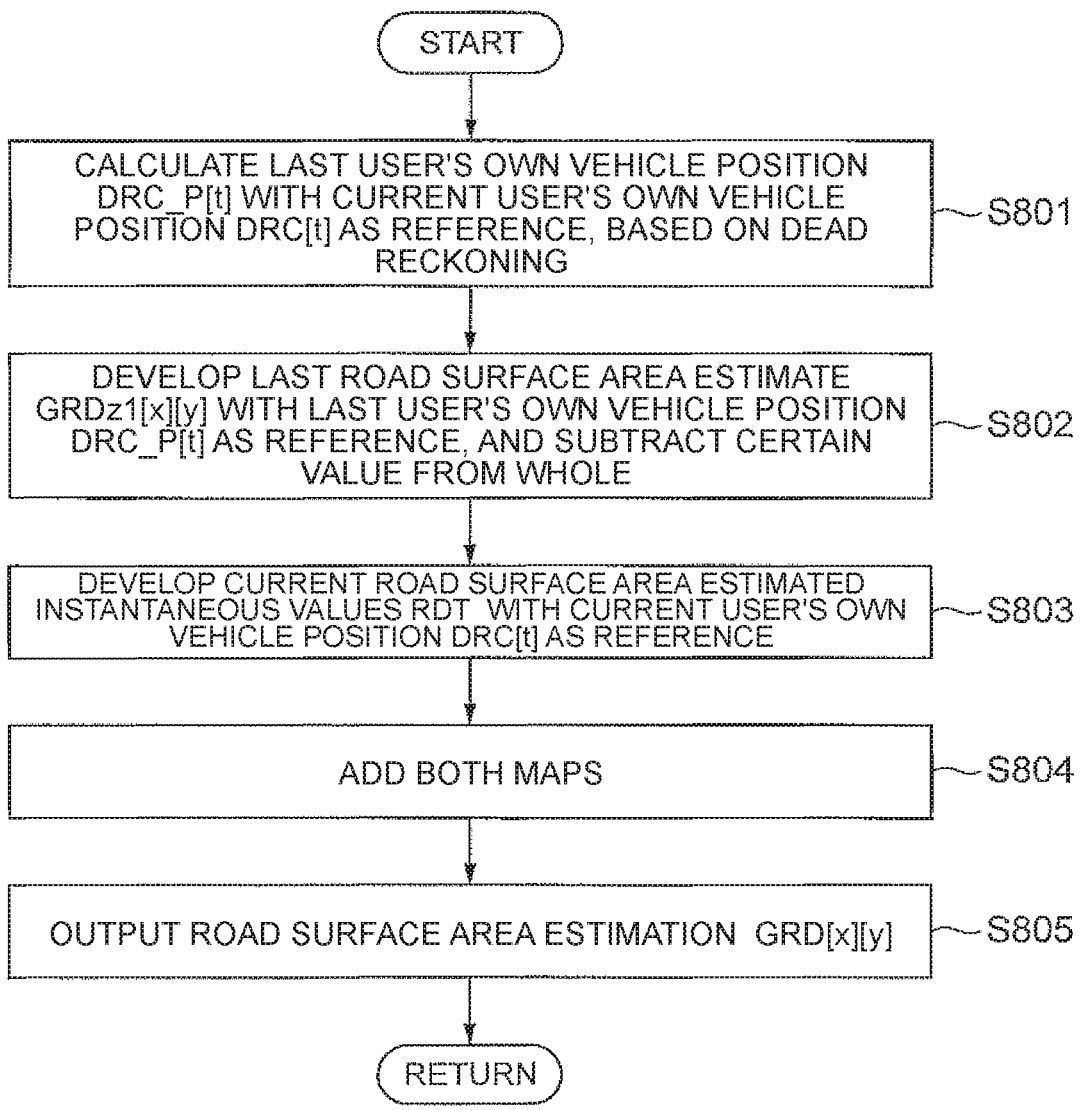
FIG. 8 is a flowchart illustrating a flow of a time-series process.

FIG. 7 is a flowchart showing a flow of the process of the road surface area estimating portion 1041.

The road surface area estimating portion 1041 performs the process for the input images IMGSRC[x][y]. There are various methods for estimating a road surface area from an image, for example, a method using machine learning and a method using a degree of similarity in an image and the like. In the present embodiment, a method for performing the estimation using a result of the feature point position measuring portion 1021 is used.

First, at step S701, the input image IMGSRC[x] [y] is divided into a plurality of local areas R[r].

Next, at step S702, feature points with heights within a range of a road surface height (thZrmin, thZrmax) in the distance table FPW[p]=(x, y, z) measured from the feature points are extracted, and tables rd[d] of ID's of local areas R[r] to which the feature points belong are extracted.

Hereinafter, a process of steps S703 to S705 is repeated for rd[d] from d=0 to d=D.

First, at step S703, image histogram information Hst1 is acquired from the local areas R[rd[d]] to which the feature points with heights within the range of the road surface height belong.

Next, at step S704, processes of steps S704 and S705 below are performed for local areas R[r'] near the local areas R[rd[d]] to which the feature points with heights within the range of the road surface height belong. As for judgment about whether near or not, for example, such an area that a distance between centers of a local area R[rd[d]] and a local area R[r'] is equal to or smaller than a threshold thRDist is judged to be near.

First, at step S704, histogram information about Hst2 about the local area R[r'] is acquired.

Then, at step S705, a degree of similarity Match between the histograms Hst1 and Hst2 is calculated. If the degree of similarity is equal to or larger than a threshold thMatch, ID=r' of the local area R[r'] is registered with a table rdm[dm].

When the process for all the ID's r' ends, the next rd[d] is selected, and the flow returns to step S703.

When the process ends for all the tables rd[d] ends, the flow moves to step S706, where all of local areas R[rd[d]] and R[rdm[dm]] belonging to rd[d] and rdm[dm] are extracted as road surface area estimated instantaneous values RDI[t] in the image.

Furthermore, at step S707, borders of the road surface area are converted to road surface estimated instantaneous values RDT[x][y] at world coordinates using camera geometry information, and a time-series process is performed.

The time-series process of step S707 will be described using FIGS. 8 and 9. FIG. 8 shows a flow of the process, and FIG. 9 is an explanatory diagram of the time-series process.

First, at step S801, a current own user's own vehicle position DRC[t] and the last user's own vehicle position DRC[t−1] are acquired based on dead reckoning information, and the last user's own vehicle position DRC P[t] with the current user's own vehicle position DRC[t] as a reference is calculated. FIG. 9(*a*) shows an example thereof. In FIG. 9(*a*), the current user's own vehicle position is indicated by a solid line, and the last user's own vehicle position is indicated by a broken line.

Next, at step S802, the last road surface area estimation result GRDz1[x] [y] is developed with the last user's own vehicle position DRC P[t] as a reference, and a certain value is subtracted from the whole. FIG. 9(*b*) shows an example thereof. In FIG. 9(*b*), the last road surface area estimation result 151 is indicated by a broken line.

Then, at step S803, current road surface area estimated instantaneous values RDT[t] [x] [y] are developed with the current user's own vehicle position DRC[t] as a reference. FIG. 9(*c*) shows an example thereof. In FIG. 9(*c*), the current road surface area estimated instantaneous values 152 is indicated by a solid line.

Then, at step S804, the last road surface area estimation result RDT[t−1] [x] [y] and the current road surface area estimated instantaneous values RDT[t][x][y] are added. FIG. 9(*d*) shows an example thereof. In FIG. 9(*d*), an overlapped area 153 between the last and current road surface area estimated instantaneous values is indicated by hatching.

Furthermore, at step S805, the overlapped area is outputted as a current road surface area estimation result GRD[x] [y], and, at the same time, the current road surface area estimation result is copied to the last road surface area estimation result GRDz1[x][y].

[Obstacle Judging Portion 1051]

Next, content of the process of the obstacle judging portion 1051 will be described using FIGS. 10 and 11.

Figure 10:
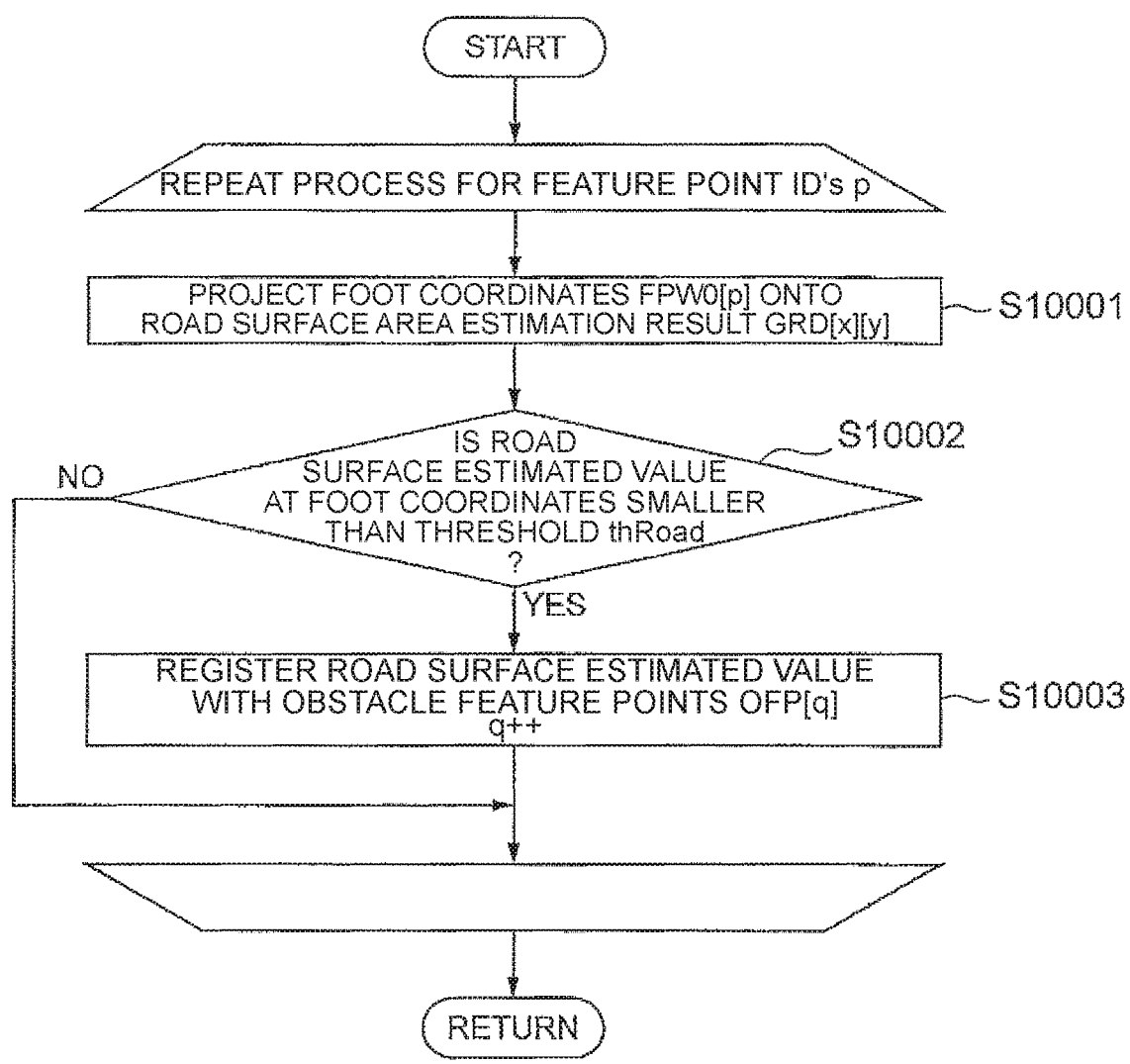
FIG. 10 is a flowchart showing a flow of a process of an obstacle judging portion.

FIG. 10 is a flowchart showing a flow of the process of the obstacle judging portion 1051.

The process is repeated for p=0 to p=P, which are feature point ID's, from steps S10001 to step S1003.

First, at step S10001, foot coordinates FPW0[p] of each feature point FP[p] are acquired.

Next, at step S10002, the foot coordinates FPW0[p] are projected onto the road surface area estimation result GRD[x] [y] to confirm the foot coordinates. If a road surface area estimated value at the foot coordinates FPW0[p] is smaller than a threshold thRoad, that is, does not indicate a road surface, the flow moves to step S10003, where the feature point is registered with the obstacle feature points OFP[q].

The above process is performed for all the feature points FP[p].

Figure 11:
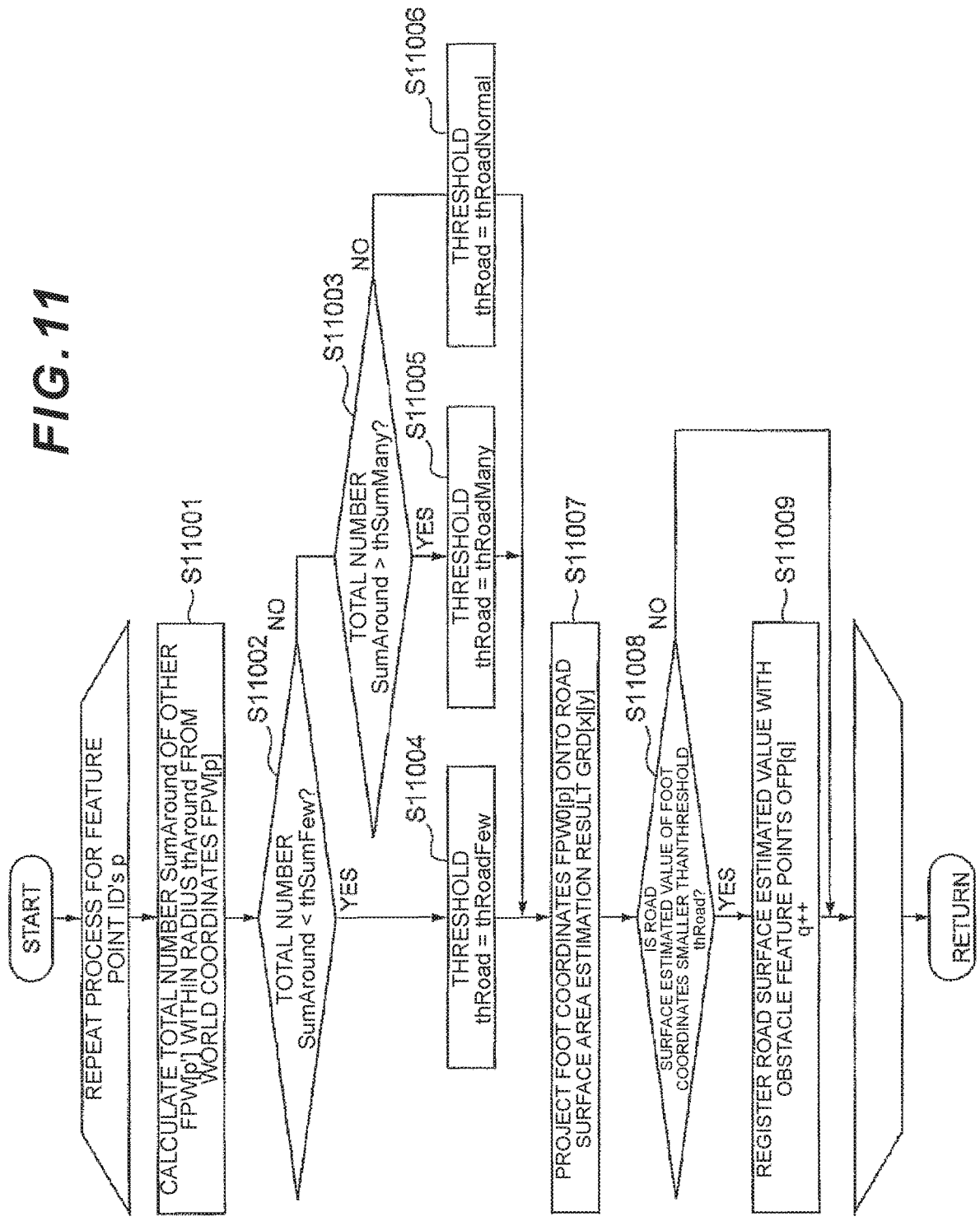
FIG. 11 is a flowchart showing a flow of a different process of the obstacle judging portion.

FIG. 11 is a flowchart showing a flow of a different process of the obstacle judging portion 1051.

The process is repeated for p=0 to p=P, which are feature point ID's, from steps S11001 to S11009.

First, at step S11001, distances between world coordinates FPW[p] of the feature points FP[p] and world coordinates FPW[p'] of all feature points other than p are compared to calculate a total number SumAround of feature points within a radius thAround. In the present embodiment, only (x, y) among the world coordinates (x, y, z) are used for the calculation of the distances.

Next, at step S11002, the total number SumAround and a threshold thSumFew are compared. If the total number SumAround is smaller, the flow proceeds to step S11004. Otherwise, the flow proceeds to step S11005, and the total number SumAround and a threshold thSumMany are compared. If the total number SumAround is larger, the flow proceeds to step S11005. Otherwise, the flow proceeds to step S11006.

At steps S11004 to S11006, the threshold thRoad used at later stages is set. At step S11004, the threshold thRoad=thRoadFew is set. At step S11005, the threshold thRoad=thRoadMany is set. At step S11006, the threshold thRoad=thRoadNormal is set.

Here, thRoadFew<thRoadNormal<thRoadMany is assumed.

Next, at step S11007, the foot coordinates FPW0[p] of the feature points FP[p] are acquired.

Next, at step S11008, the foot coordinates FPW0[p] are projected onto the road surface area estimation result GRD[x] [y] to confirm the foot coordinates. If the road surface area estimated value at the foot coordinates FPW0 [p] is smaller than the threshold thRoad, that is, does not indicate a road surface, the flow moves to step S10003, where the feature point is registered with the obstacle feature points OFP[q].

The above process is performed for all the feature points FP[p].

As described for the feature point foot position calculating portion 1031, at the time of calculating a feature point foot position, it is possible to, by the process of determining image coordinates at a position higher than a road surface height once and assuming that the point exists at the road surface height, appropriately judge an obstacle to be an obstacle even in a case where a camera installation height is low, and a target object floats in the air, like a bumper of a vehicle.

Further, as described for the obstacle judging portion 1051, it is possible to, by causing a threshold for feature points to change according to a degree of density of the feature points, make setting so that such a feature point that is isolatedly outputted like an outlier can be easily removed.

According to the on-board outside recognition apparatus 1000 of the present embodiment, a process for extracting feature points from an image including an environment around a user's own vehicle, measuring three-dimensional positions of the feature points based on movements of the feature points tracked in time series on the image, and calculating foot positions on the image from the three-dimensional positions of the feature points is performed. Then, a process for extracting a road surface area where the user's own vehicle can travel from the image using a degree of similarity of a texture of the image, judging feature points the foot positions of which are judged not to be included in the road surface area to have a high reliability, judging a feature point the foot position of which is judged not to be included in the road surface area to be highly reliable, and judging a feature point the foot position of which is judged to be included in the road surface area to be unreliable is performed. As for the feature point that is highly reliable, the possibility of being a feature point of a stationary obstacle around the user's own vehicle is high.

On the other hand, as for the feature point the foot position of which is included in the road surface area, the possibility of being a feature point of a stationary obstacle around the user's own vehicle is low, and, for example, it is expected that the feature point has been misdetected by a mobile body. The on-board outside recognition apparatus 1000 judges a probability of a feature point using overlap between a measured foot position of the feature point and a road surface area. Therefore, even if the foot position of the feature point and a position of an edge are different, or it is difficult to observe a foot edge, it does not influence. Further, misjudgment due to an edge that accidentally exists does not occur.

Second Embodiment

Next, a second embodiment of the on-board outside recognition apparatus of the present invention will be described below using drawings.

Figure 12:
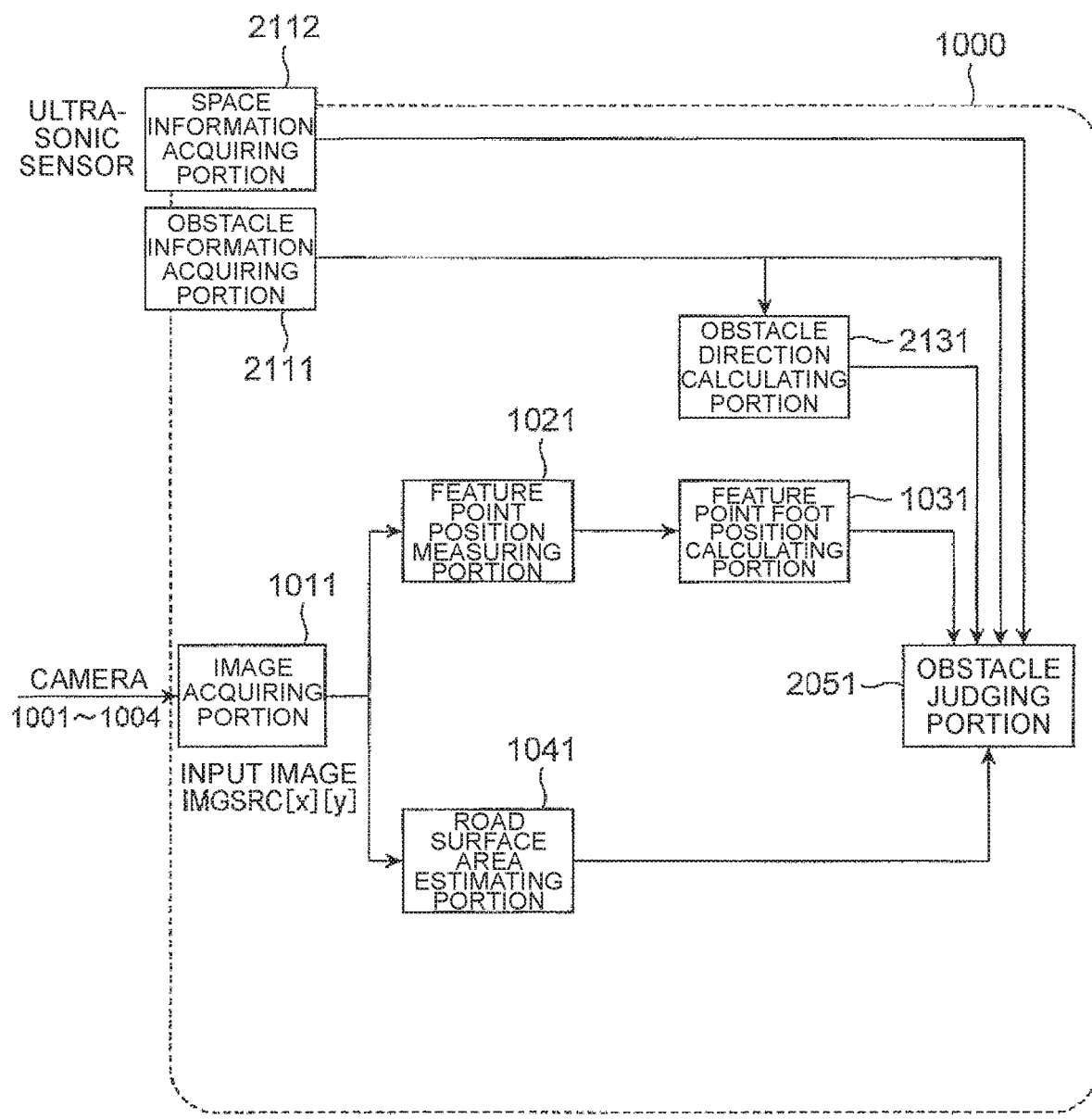
FIG. 12 is a block diagram showing a configuration of an on-board outside recognition apparatus in a second embodiment.

FIG. 12 is a block diagram showing a configuration of an on-board outside recognition apparatus 2000 in the second embodiment. Note that, in the description below, only portions different from the portions of the on-board outside recognition apparatus 1000 in the first embodiment described above will be described in detail. As for similar portions, the same reference numerals will be given, and detailed description thereof will be omitted.

What are characteristic in the present embodiment is that an obstacle information acquiring portion 2111 and a space information acquiring portion 2112 are provided, that an obstacle direction calculating portion 2131 using obstacle information obtained from the obstacle information acquiring portion 2111 is further provided and that these are inputted to an obstacle judging portion 2051 to perform processing content different from the first embodiment.

The on-board outside recognition apparatus 2000 is incorporated in a camera apparatus mounted on a car, an integrated controller or the like and is for recognizing an outside from images photographed by the cameras 1001 to 1004. In the present embodiment, the on-board outside recognition apparatus 2000 is configured to recognize an obstacle around a user's own vehicle.

The on-board outside recognition apparatus 2000 is configured with a computer having a CPU, a memory, I/O and the like. A predetermined process is programmed, and the process is repeatedly executed at a predetermined cycle.

The image acquiring portion 1011 acquires an image including an environment around the user's own vehicle. As shown in FIG. 2, the image acquiring portion 1011 acquires, from the cameras 1001 to 1004 attached at positions where it is possible to capture an image of surroundings around the user's own vehicle 10, at least one or more of images 1005 to 1008 obtained by photographing the surroundings around the user's own vehicle. In the present embodiment, based on information about a travel direction of the user's own vehicle 10, the image 1005 captured up by the front camera 1001 is acquired during forward travel, and the image 1008 captured by the rear camera 1004 is acquired during backward travel. The acquired image is recorded onto a RAM as IMGSRC[x] [y]. Since the image acquiring portion 1011 is similar to that of the first embodiment, description will be omitted.

By detecting the feature points FP[p] from the input image IMGSRC[x] [y] and tracking the feature points FP[p] in time series, the feature point position measuring portion 1021 measures a three-dimensional distance table FPW[p] from an image coordinate table FPI[p] for each feature point. Since the feature point position measuring portion 1021 is similar to that of the first embodiment, description will be omitted.

The feature point foot position calculating portion 1031 calculates foot positions FPW0[p] of the feature points FP[p] from the world coordinates FPW[p] of the feature points FP[p] using camera geometry information such as an installation height and angle of the camera. Since the feature point foot position calculating portion 1031 is similar to that of the first embodiment, description will be omitted.

From the input image IMGSRC[x] [y], the road surface area estimating portion 1041 analyzes texture information about the images to extract a road surface area. There are various ways of holding information. In the present embodiment, it is assumed that a grid map GRD[x] [y] is used. Since the road surface area estimating portion 1041 is similar to that of the first embodiment, description will be omitted.

The obstacle information acquiring portion 2111 acquires obstacle information SOBJ[b] acquired from an ultrasonic sensor. Here, SOBJ[b] is a one-dimensional array of a table having elements of world coordinates (x, y, z) with the center of the rear wheel axle of the user's own vehicle as the origin, and b indicates an ID when a plurality are detected. Note that, though the ultrasonic sensor will be described as an example of a sensor for detecting an obstacle around the user's own vehicle in the present embodiment, any sensor capable of performing detection by a sound wave or a beam is possible, and, for example, at least one of a laser radar, a LIDAR and a monocular camera mounted on the user's own vehicle may be used. The obstacle information acquiring portion 2111 may be only required to be such that is capable of acquiring information about an obstacle, and may acquire information transmitted from other vehicles and information transmitted from infrastructure facilities such as parking lots.

The space information acquiring portion 2112 acquires information about a space where the user's own vehicle can travel, from a result of detection of an obstacle around the user's own vehicle detected by the ultrasonic sensor. Specifically, the space information acquiring portion 2112 acquires space information SFS[f] in which a space just before an obstacle detected by the ultrasonic sensor can be confirmed. Here, the space information SFS[f] is information about a space from each ultrasonic sensor to an obstacle, which is obtained from each ultrasonic sensor, that is, a one-dimensional array of a table in which a travelable distance is indicated by a distance, and f indicates the number of ultrasonic sensors attached.

The obstacle direction calculating portion 2131 calculates obstacle directions θL and θR on the left and right of the user's own vehicle from the obstacle information acquired from the obstacle information acquiring portion 2111. Details of the process will be described later.

The obstacle judging portion 2051 performs space feature calculation of calculating, from three-dimensional position of feature points, a density of other feature points existing around a predetermined feature point, and compares the degree of density of the feature points, the foot position of the feature point in the image, and the road surface area to judge whether the feature point is a feature point of an obstacle or not. Specifically, the obstacle judging portion 2051 generates an obstacle feature point OFP[q] by utilizing the feature point foot position FPW0[p], the road surface area estimation result GRD[x] [y], and, furthermore, information such as the obstacle information SOBJ[b], the space information SFS[f] and the obstacle directions 8L and θR. Details of the process will be described later.

[Obstacle Direction Calculating Portion 2131]

Next, content of the process of the obstacle direction calculating portion 2131 will be described using FIG. 13.

Figure 13:
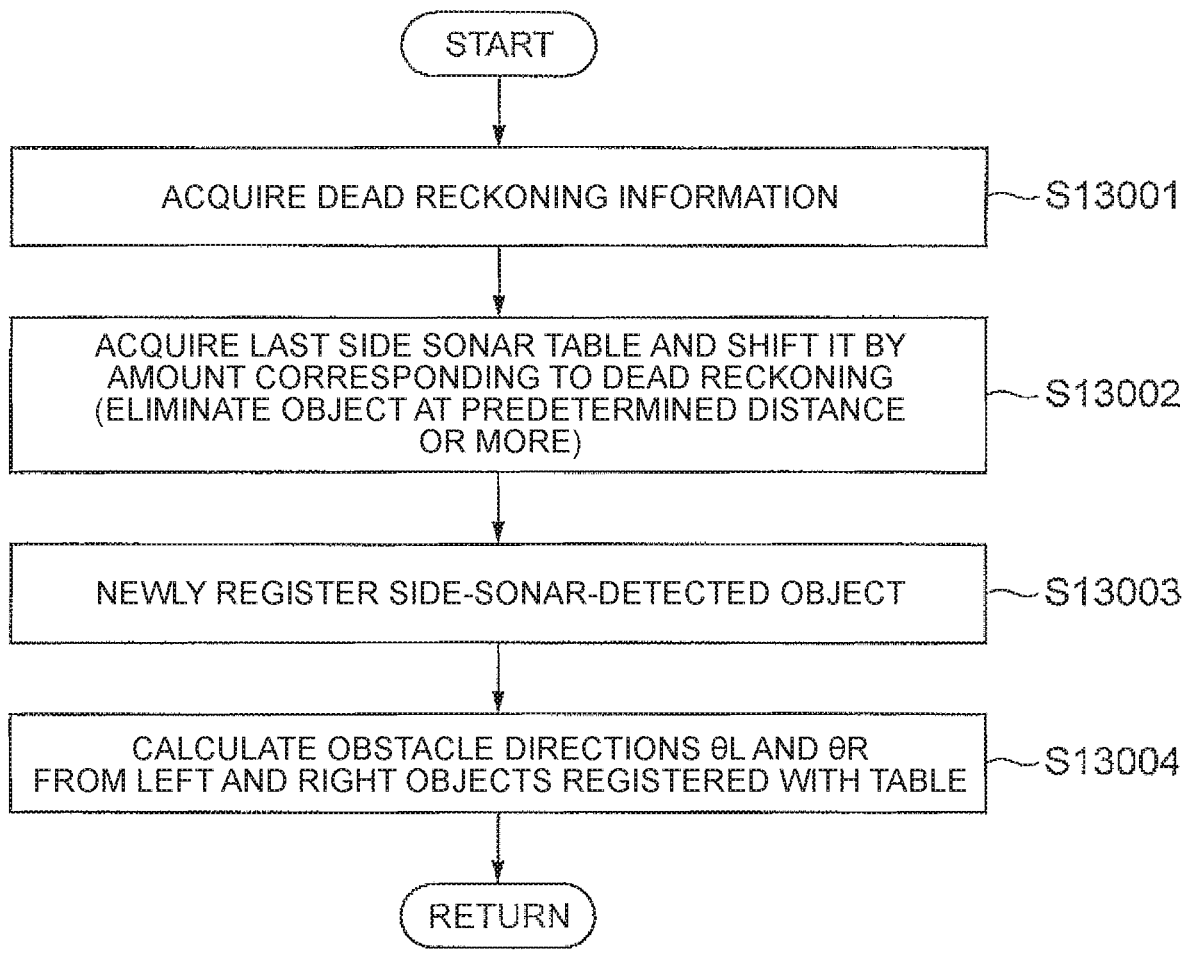
FIG. 13 is a flowchart showing a flow of a process of an obstacle direction calculating portion.

FIG. 13 is a flowchart showing a flow of the process of the obstacle direction calculating portion 2131. Various methods for calculating a direction of an obstacle are conceivable. In the present embodiment, a method in which side sonar information, in which information about obstacle detection in a lateral direction of the user's own vehicle by a side sonar is accumulated in time series, is accumulated in a side sonar table and used will be described.

It is assumed that detection coordinates (x, y) in the coordinate system with the center of the rear wheel axle of the user's own vehicle as the origin and time stamps corresponding to dead reckoning are stored in the side sonar table.

First, at step S13001, dead reckoning information is acquired.

Next, at step S13002, the side sonar table processed last is acquired, and information in the table is moved by an amount corresponding to movement performed until the current processing after the last processing, which is calculated by dead reckoning. Information about an obstacle which is away from the user's own vehicle by a predetermined distance or more as a result of the movement is eliminated. In the present embodiment, information about obstacles that are behind the user's own vehicle by 5 m or more is eliminated.

Then, at step S13003, side sonar information acquired after the last processing is registered with the side sonar table.

Furthermore, at step S13004, the least squares method is applied to each of pieces of obstacle information for the left and right of the user's own vehicle to calculate an obstacle direction 8L and an obstacle direction θR from an obstacle on the left side of the user's own vehicle and an obstacle on the right side of user's own vehicle, respectively.

Note that, in the present embodiment, if the number of points in the lateral direction of the user's own vehicle is smaller than a threshold THSSNUM, that is, if the number of points sufficient to calculate the least squares method do not exist, or if an average SSDIS of distances between a line calculated by the least squares method and all the side-sonar obstacle points is equal to or larger than a threshold THSSDIS, not the calculated obstacle directions but the direction of the user's own vehicle is adopted.

For the process described above, an example of calculation in a scene as shown in FIG. 18(*a*) will be described.

FIG. 18(*a*) shows an example of a scene in a parking lot having parking lot lines, which is an example in which there is an empty parking space 1801 for one vehicle on the left side of the user's own vehicle 10, and other vehicles 1802, which are obstacles, are parked on the left and right sides of the empty parking space 1801.

First, FIG. 18(*b*) shows a result of having accumulated information about obstacle detection in the lateral direction of the user's own vehicle by the side sonar, in time series in the scene of FIG. 18(*a*). The other vehicles 1802 are arranged on the left side of the user's own vehicle 10, and they are detected by the side sonar and exist as a plurality of side-sonar obstacle points. A result of calculating the obstacle direction θL on the left side of the user's own vehicle by the process of step S13004 here is indicated by a broken line in FIG. 18(*c*). In the case of this scene, since there is not a side-sonar obstacle point on the right side of the user's own vehicle, the obstacle direction θR on the right side of the user's own vehicle is the direction of the user's own vehicle.

[Obstacle Judging Portion 2051]

Next, content of the process of the obstacle judging portion 2051 will be described using FIGS. 14 to 17.

The obstacle judging portion 2051 calculates a density of other feature points existing around a predetermined feature point and presence/absence of other feature points in the obstacle direction θL, and makes a judgment about whether the feature point is a feature point of an obstacle or not based on presence/absence of the other feature points in the obstacle direction θL, the density of the feature points, and a result of comparing the foot position of the feature point and the road surface area.

First, an example 1 of the obstacle judging portion 2051 will be described using FIGS. 14 and 15.

Figure 14:
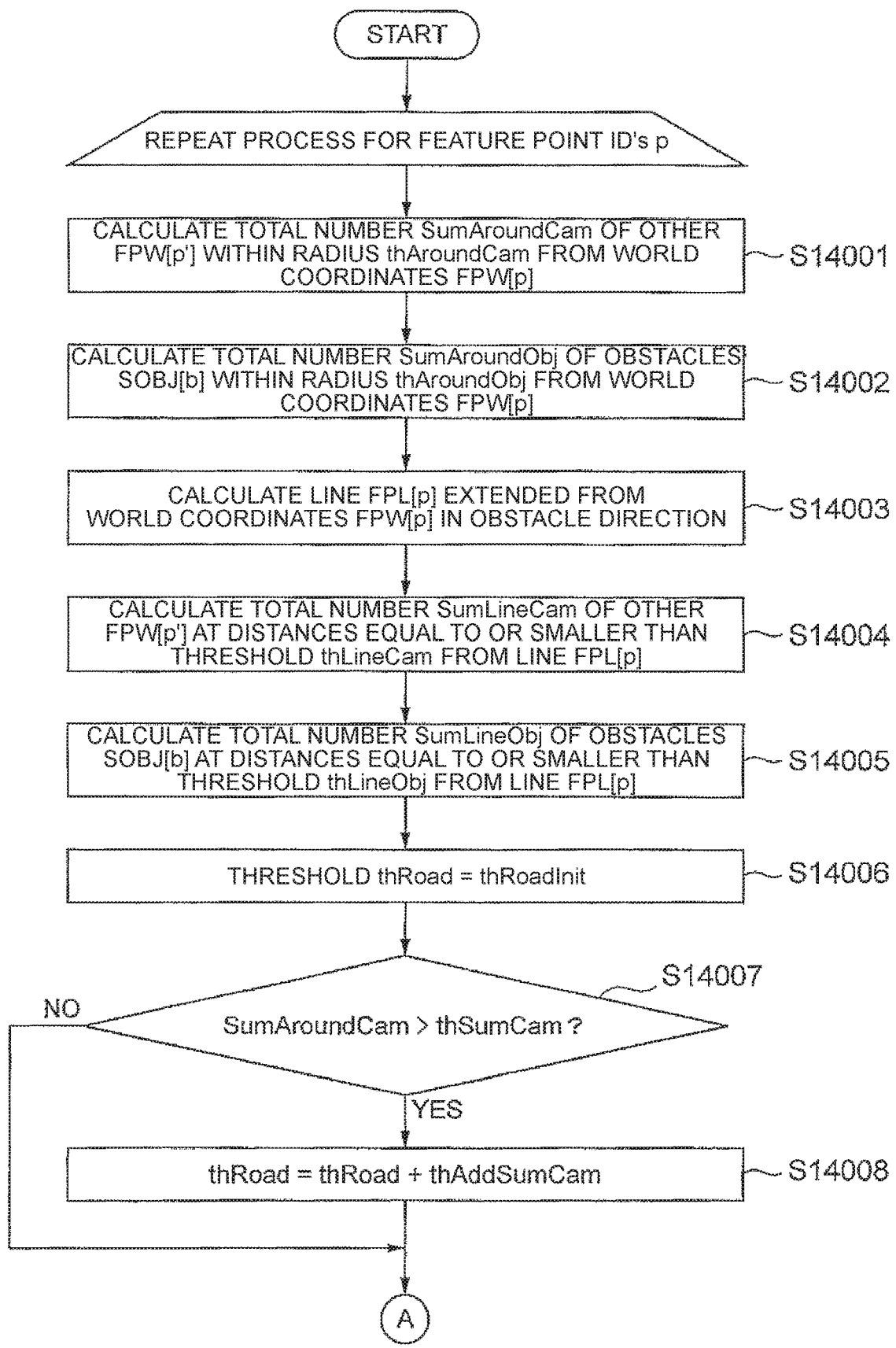
FIG. 14 is a flowchart showing a flow of a process of an obstacle judging portion.
Figure 15:
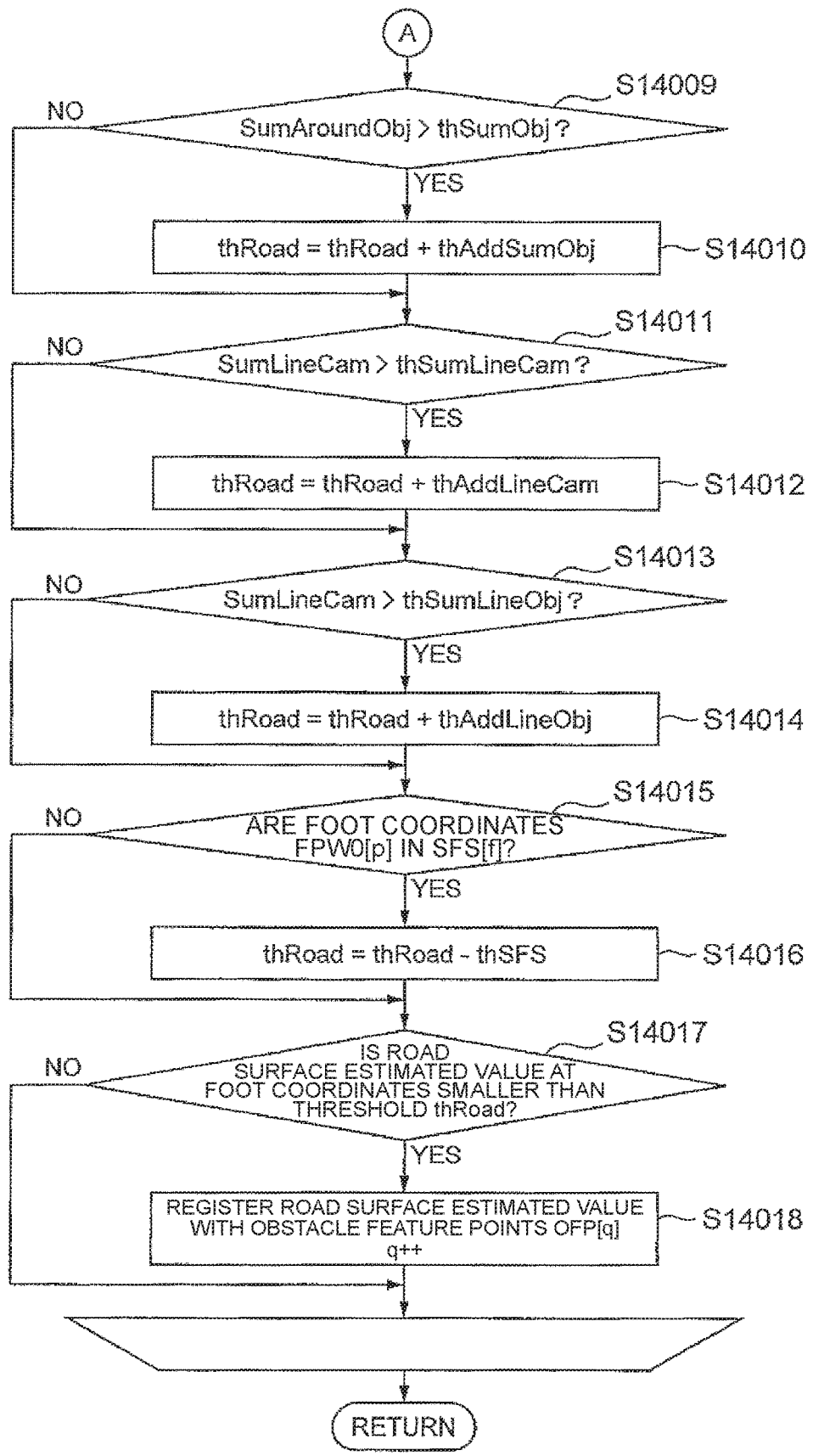
FIG. 15 is a flowchart showing the flow of the process of the obstacle judging portion.

FIGS. 14 and 15 are flowcharts showing a flow of the process of the obstacle judging portion 2051.

This process is performed for all the feature points FP[p].

First, at step S14001, a total number SumAroundCam of world coordinates FPW[p'] of other feature points within a radius thAroundCam is calculated from world coordinates FPW[p] of each feature point FP[p]. In the present embodiment, only (x, y) among the world coordinates (x, y, z) are used for calculation of distances.

Next, at step S14002, a total number SumAroundObj of ultrasonic sensor obstacles SOBJ[b] within a radius thAroundObj is calculated from the world coordinates FPW[p].

Next, at step S14003, a line FPL[p] extended from the world coordinates FPW[p] in an obstacle direction is calculated.

Then, at step S14004, a total number SumLineCam of world coordinates of world coordinates FPW[p'] of other feature points at vertical distances equal to or smaller than a threshold thLineCam from the line FPL[p] is calculated.

Further, at step S14005, a total number SumLineObj of ultrasonic sensor obstacles SOBJ[b] at vertical distances equal to or smaller than a threshold thLineObj from the line FPL[p] is calculated.

After that, the flow enters a threshold adjustment step. First, at step S14006, an initial threshold thRoad=thRoadInit is set.

Next, at step S14007, SumAroundCam and thSumCam are compared. If SumAroundCam is larger (SumAroundCam>thSumCam), thAddSumCam is added to the threshold thRoad at step S14008, and the flow proceeds to the next. Otherwise (SumAroundCam≤thSumCam), the flow proceeds to the next without doing anything.

Next, at step S14009, SumAroundObj and thSumObj are compared. If SumAroundObj is larger (SumAroundObj>thSumObj), thAddSumObj is added to the threshold thRoad at step S14010, and the flow proceeds to the next. Otherwise (SumAroundObj≤thSumObj), the flow proceeds to the next without doing anything.

Next, at step S14011, SumLineCam and thSumLineCam are compared. If SumLineCam is larger (SumLineCam>thSumLineCam), thAddLineCam is added to the threshold thRoad at step S14012, and the flow proceeds to the next. Otherwise (SumLineCam≤thSumLineCam), the flow proceeds to the next without doing anything.

Next, at step S14013, SumLineObj and thSumLineObj are compared. If SumLineObj is larger (SumLineObj>thSumLineObj), thAddLineObj is added to the threshold thRoad at step S14014, and the flow proceeds to the next. Otherwise (SumLineObj≤thSumLineObj), the flow proceeds to the next without doing anything.

Furthermore, at step S14015, it is judged whether the foot coordinates FPW0[p] are in a sonar space SFS[f] or not. If the foot coordinates FPW0[p] are within the space, thSFS is subtracted from the threshold thRoad at step S14016h. Otherwise (if the foot coordinates FPW0[p] is outside the sonar space SFS[f]), the flow proceeds to the next without doing anything.

At step S14017, it is judged whether a road surface estimated value of the foot coordinates is smaller than the threshold thRoad or not using the threshold thRoad adjusted by the above. If the road surface estimated value is smaller than the threshold, the flow proceeds to step S14018, where the feature point is registered as an obstacle feature value OFP[q]. Otherwise (if the road surface estimated value is equal to or larger than the threshold), the flow proceeds to the next without doing anything.

Figure 16:
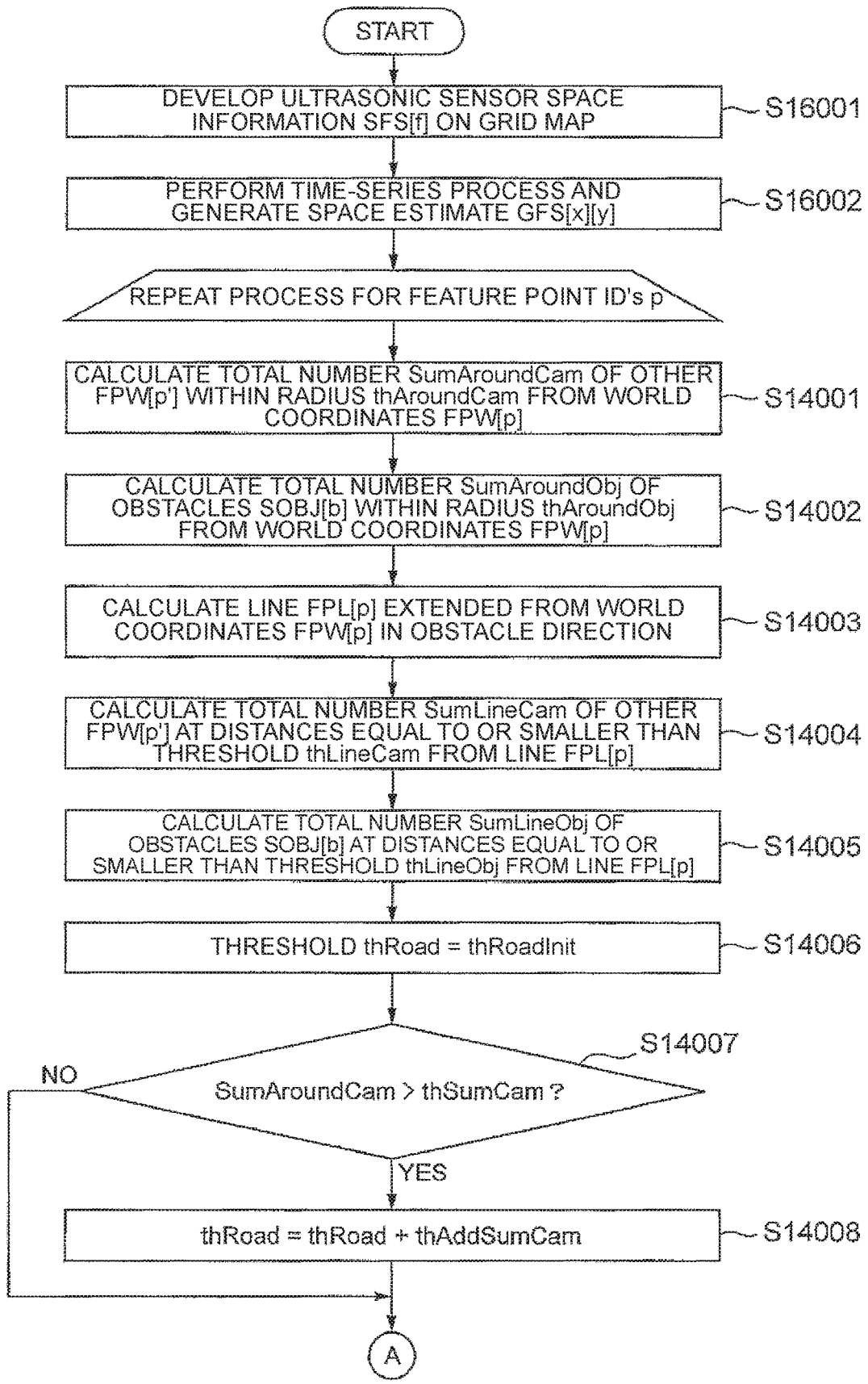
FIG. 16 is a flowchart showing a flow of a process of the obstacle judging portion.
Figure 17:
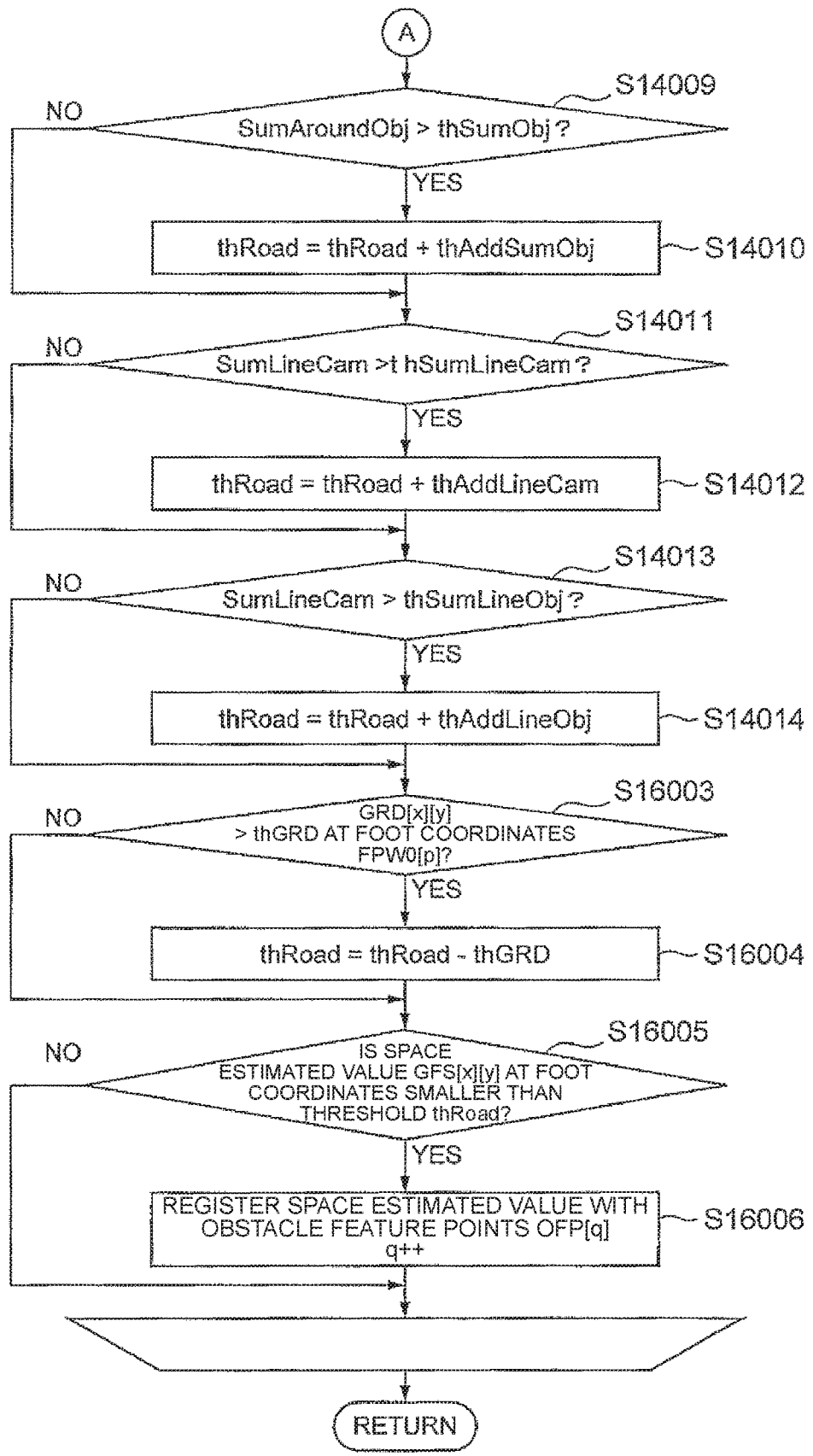
FIG. 17 is a flowchart showing the flow of the process of the obstacle judging portion.

Next, an example 2 of the obstacle judging portion 2051 will be described using FIGS. 16 and 17. FIGS. 16 and 17 are flowcharts showing a flow of a process of the obstacle judging portion 2051. In the drawings, parts where the same operations as FIG. 14 or 15 are performed will be given the same reference numerals.

First, at step S16001, the space information SFS[f] obtained from the ultrasonic sensor is developed on a grid map of the center of the rear wheel axle of the user's own vehicle.

Then, at step S16002, a time-series process is performed to determine a space estimation map GFS[x][y]. Since a flow of the time-series process is similar to the flow shown in FIGS. 8 and 9, description will be omitted here.

Since steps S14001 to S14014 after that are similar to the above description, description will be omitted.

After step S14014, the road surface area estimation result GRD[x][y] at a position of the foot coordinates FPW0[p] and the threshold thGRD are compared as step S16003. If the road surface area estimation result GRD[x] [y] is equal to or larger than the threshold (road surface area estimation result GRD[x][y]>threshold thGRD), thGRD is subtracted from the threshold thRoad at step S16004. Otherwise (road surface area estimation result GRD[x][y] threshold thGRD), the flow proceeds to the next without doing anything.

Next, as step S16005, by referring to the space estimation map GFS[x] [y] at the position of the foot coordinates FPW0[p], for which the time-series process has been performed, the values of the map and the threshold thRoad are compared. If the value is smaller than the threshold, the flow proceeds to step S16006, and the feature point is registered as an obstacle feature point OFP[q]. If the value is equal to or larger than the threshold, the flow proceeds to the next without doing anything.

For content of steps S14001 to S14014 in the above process, an example of calculation in such a scene as shown in FIG. 19(a) will be described. FIG. 19(a) shows an example of a scene in a parking lot having parking lot lines, which is an example in which there is an empty parking space 1901 for one vehicle on the left side of the user's own vehicle, and a pedestrian 1903 is approaching from the front of the user's own vehicle. On both sides of the empty parking space 1901, other vehicles 1902, which are obstacles, are parked.

FIG. 19(b) shows a result of detection by the camera and the sonar, which is obtained from the scene of FIG. 19(a). Black points indicate a result of detection by the camera, that is, world coordinates FPW[p] calculated from feature points FP[p]. White points indicate points detected by the sonar, that is, obstacle points SOBJ[b]. Among these, for the world coordinates FPW[p] of the feature points FP[p], the process from S14001 to S14014 is performed.

Figure 19:
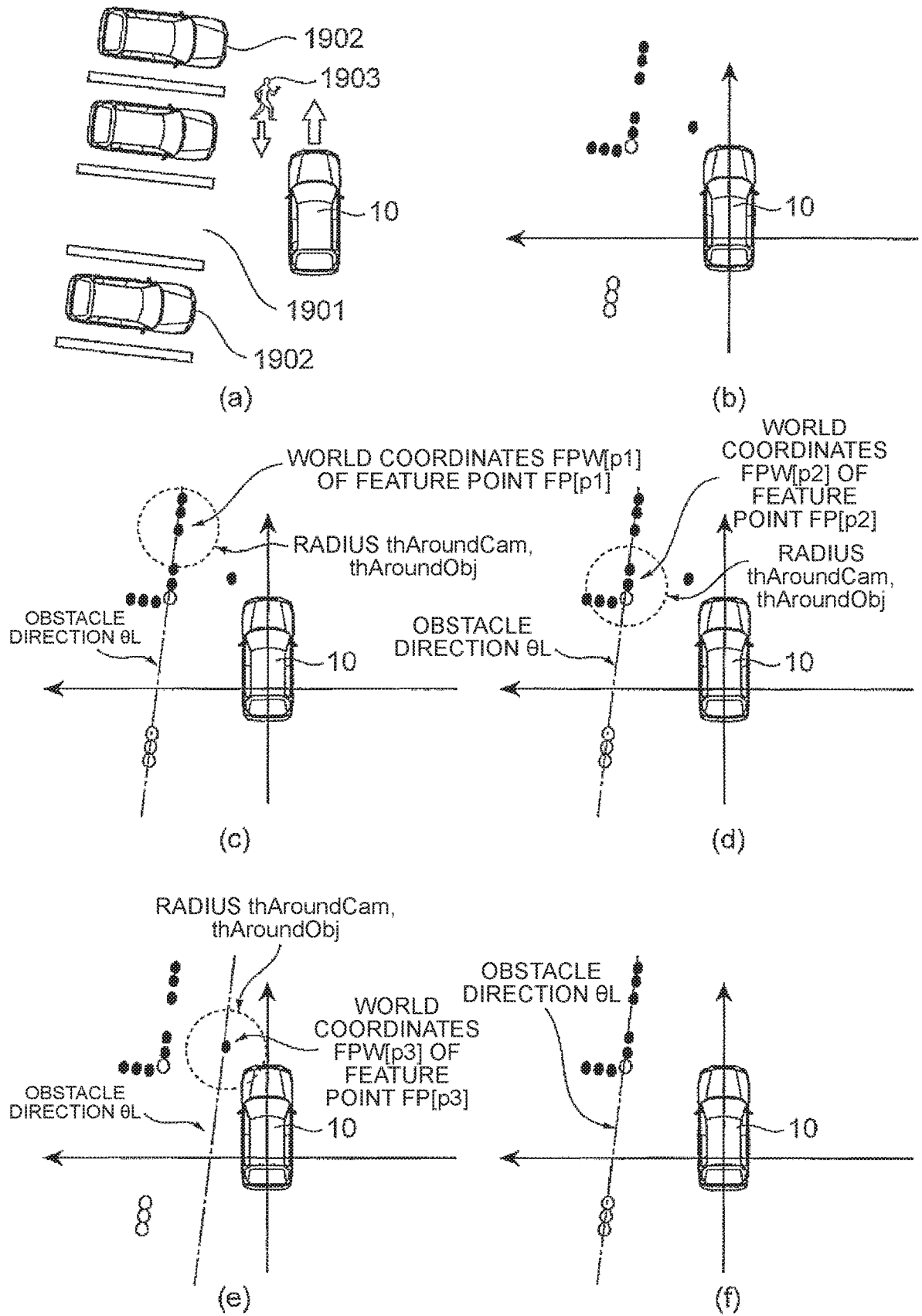
FIG. 19 is a diagram illustrating an example of obstacle judgment by the obstacle judging portion.

Note that, in the description of FIG. 19, it is assumed that the radiuses thAroundCam and thAroundObj are the same, and thSumCam=1, thSumObj=1, thLineCam=1 and thLineObj=1 are assumed.

FIG. 19(c) shows an example of the process for a feature point FP[p1]. Since world coordinates FPW[p] of other feature points exist within the radius thAroundCam, SumAroundCam has a value larger than 0. Since other obstacle points SOBJ[b] do not exist within the radius thAroundObj, SumAroundObj is 0. A straight line is drawn in the obstacle direction θL on the left side of the user's own vehicle from the world coordinates FPW[p1], and the number of feature points and the number of obstacles near the straight line are counted. Here, since both of world coordinates of feature points and obstacle points exist at positions near the straight line, both of SumLineCam and SumLineObj have values larger than 0. Therefore, the threshold thRoad for the feature point FP[p1] has a large value in the process from steps S14006 to S14014.

FIG. 19(d) shows an example of the process for a feature point FP[p2]. Since world coordinates FPW[p] of other feature points exist within the radius thAroundCam, SumAroundCam has a value larger than 0. Furthermore, since other obstacle points SOBJ[b] exist within the radius thAroundObj, SumAroundObj also has a value larger than 0.

A straight line is drawn in the obstacle direction θL on the left side of the user's own vehicle from the world coordinates FPW[p2], and the number of feature points and the number of obstacles near the straight line are counted. Here, since both of world coordinates of feature points and obstacle points exist at positions near the straight line, SumLineCam and SumLineObj have values larger than 0. Therefore, the threshold thRoad for the feature point FP[p1] has a large value in the process from steps S14006 to S14014.

FIG. 19(e) shows an example of the process for a feature point FP[p3]. Since world coordinates FPW[p] of other feature points do not exist within the radius thAroundCam, SumAroundCam is 0. Furthermore, since other obstacle points SOBJ[b] do not exist within the radius thAroundObj, SumAroundObj is also 0. A straight line is drawn in the obstacle direction θL on the left side of the user's own vehicle from the world coordinates FPW[p3], and the number of feature points and the number of obstacles near the straight line are counted. Here, since neither world coordinates of feature points nor obstacle points exist at positions near the straight line, both of SumLineCam and SumLineObj are 0. Therefore, the threshold thRoad for the feature point FP[p3] does not change from thRoadInit as a result of the process from steps S14006 to S14014.

As described above, a threshold is adjusted according to presence/absence of other feature points and obstacle points around world coordinates FPW[p] of each feature point FP[p] and feature points and obstacle points in an obstacle direction. For example, the threshold for the feature point in FIG. 19(c) or (d) is set high, and the feature point is not easily removed. On the other hand, the threshold for the feature point in FIG. 19(e) is set low, and the feature point is easily removed. As a result, a feature point misdetected due to a factor such as a mobile body can be removed as in FIG. 19(f).

As described above, in the case of using information from an ultrasonic sensor, it is possible to calculate a direction of an obstacle in a lateral direction of a user's own vehicle so that, when another obstacle exists in the obstacle direction, a feature point can be easily adopted as an obstacle feature point. Further, by using space information obtained from the ultrasonic sensor as a condition for making it difficult to adopt a feature point as an obstacle feature point, it is possible to remove a misdetected feature point more easily. Furthermore, a configuration becomes possible in which, a road surface area estimation result is used as the condition for making it difficult to adopt a feature point as an obstacle feature point, and the space information obtained from the ultrasonic sensor is used for final adoption judgment.

Figure 20:
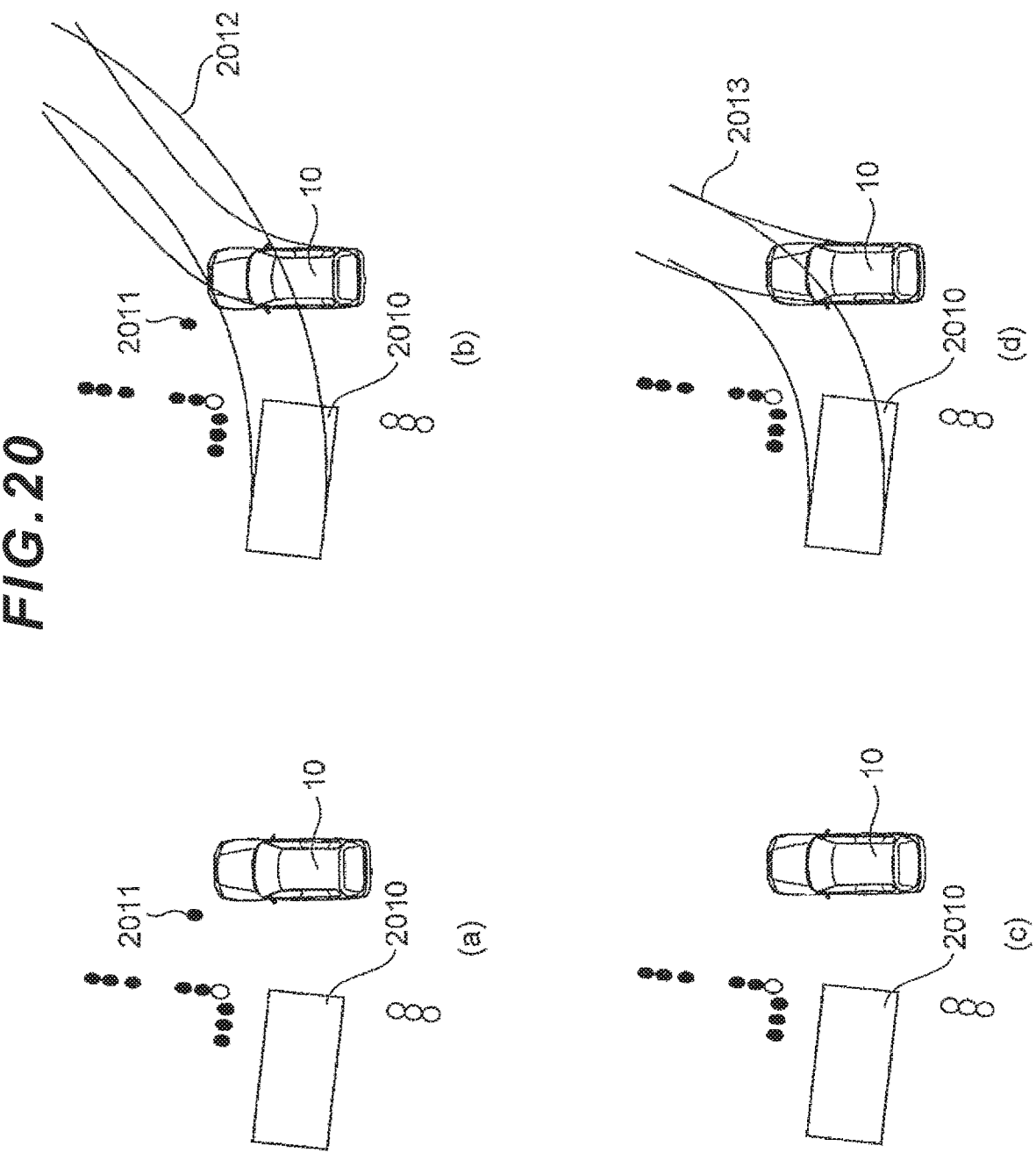
FIG. 20 is a diagram illustrating effects of the present embodiment.

Further, feature point information obtained as a result of the processes by the examples described above is used for an automatic parking route generation process. FIG. 20 is a diagram illustrating effects of the present examples.

FIG. 20(a) is a diagram in a case where the result of the processes according to the present examples is not used. A feature point 2011 of an obstacle is misdetected near the user's own vehicle 10. FIG. 20(b) shows an example in which an automatic parking route 2012 is generated in a manner of avoiding bumping the obstacle using information shown in FIG. 20(a). Note that, as for a method for generating the automatic parking route 2012 in a manner of avoiding bumping the obstacle, a publicly known technique is used, and description will be omitted here.

On the other hand, FIG. 20(c) is a diagram in a case where the result of the processes according to the present examples is used. FIG. 20(d) shows an example in which a parking route is similarly generated using information about feature points shown in FIG. 20(c). The feature point 2011 misdetected in FIG. 20(a) is removed in FIG. 20(c).

Thus, in FIG. 20(b), since the feature point 2011 which does not exist in FIG. 20(d) exists, the automatic parking route 2012 is lengthened. Further, depending on a position of the misdetected feature point 2011, there may be a case where the automatic parking route 2012 cannot be generated. On the other hand, in FIG. 20(d), the shortest automatic parking route 2013 can be generated.

REFERENCE SIGN LIST

1000: On-board outside recognition apparatus

The invention claimed is:

1. An on-board outside recognition apparatus for recognizing a travelable space around a user's own vehicle comprising:
  a memory; and
  a processor for:
  acquiring an image including an environment around the user's own vehicle;
  extracting a feature point from the image and measuring a three-dimensional position of the feature point based on movement of the feature point tracked in time series on the image;
  estimating a road surface area where the user's own vehicle can travel, from the image using a degree of similarity of a texture of the image;
  calculating a foot position projected onto the road surface area, from the three-dimensional position of the feature point; and
  judging whether the feature point is a feature point of a stationary obstacle around the user's own vehicle, according to a positional relationship between the foot position of the feature point and the road surface area, wherein
  the processor further judges that the feature point is not a feature point of a stationary obstacle around the user's own vehicle when the foot position of the feature point is included in the road surface area, and judges that the feature point is a feature point of a stationary obstacle around the user's own vehicle when the foot position of the feature point is not included in the road surface area.

2. The on-board outside recognition apparatus according to claim 1, wherein the processor further accumulates road surface area estimation results in the memory; and performs spatial feature calculation of calculating a density of other feature points existing around a predetermined feature point from the three-dimensional position of the feature point, sets a threshold according to a degree of the density of the feature points, and makes a judgment about whether the feature point is a feature point of a stationary obstacle around the user's own vehicle or not, based on the threshold.

3. The on-board outside recognition apparatus according to claim 1, comprising space information acquiring means detecting an obstacle around the user's own vehicle by a sensor and, as a result, acquiring information about a space where the user's own vehicle can travel, wherein the processor further makes a judgment about whether the feature point is a feature point of the obstacle or not, based on whether the foot position of the feature point is included in the road surface area or not and, furthermore, whether the foot position is included in the travelable space or not.

4. The on-board outside recognition apparatus according to claim 3, wherein the processor further calculates a direction of an obstacle around the user's own vehicle, and calculates a density of other feature points existing around a predetermined feature point and presence/absence of other feature points in a direction of the obstacle, and makes the judgment about whether the feature point is the feature point of the obstacle or not based on the presence/absence of the other feature points in the direction of the obstacle, the density of the feature points, and a result of comparing the foot position of the feature point and the road surface area.

5. The on-board outside recognition apparatus according to claim 1, wherein, when calculating the foot position from the three-dimensional position of the feature point, the processor sets a surface road height to a predetermined height position higher than the actual road surface to calculate image coordinates, and calculates three-dimensional coordinates at the predetermined height position of the road surface area of image coordinates.

6. An on-board outside recognition method for recognizing a travelable space around a user's own vehicle, the on-board outside recognition method comprising:
acquiring an image including an environment around the user's own vehicle;
extracting a feature point from the image and measuring a three-dimensional position of the feature point based on movement of the feature point tracked in time series on the image;
calculating a foot position projected onto the road surface area from the three-dimensional position of the feature point;
estimating a road surface area where the user's own vehicle can travel, from the image using a degree of similarity of a texture of the image;
judging that the feature point is not a feature point of a stationary obstacle around the user's own vehicle when the foot position of the feature point is included in the road surface area;
judging that the feature point is not a feature point of a stationary obstacle around the user's own vehicle when the foot position of the feature point is included in the road surface area; and
judging that the feature point is a feature point of a stationary obstacle around the user's own vehicle when the foot position of the feature point is not included in the road surface area.

* * * * *